(12) United States Patent
Kume et al.

(10) Patent No.: US 12,392,186 B2
(45) Date of Patent: Aug. 19, 2025

(54) VEHICLE DOOR DEVICE

(71) Applicant: AISIN CORPORATION, Kariya (JP)

(72) Inventors: Sho Kume, Kariya (JP); Masato Kumano, Kariya (JP)

(73) Assignee: AISIN CORPORATION, Kariya (JP)

( * ) Notice: Subject to any disclaimer, the term of this patent is extended or adjusted under 35 U.S.C. 154(b) by 388 days.

(21) Appl. No.: 18/049,655

(22) Filed: Oct. 26, 2022

(65) Prior Publication Data

US 2023/0193678 A1 Jun. 22, 2023

(30) Foreign Application Priority Data

Dec. 21, 2021 (JP) ................. 2021-207143

(51) Int. Cl.
*E05D 15/34* (2006.01)
*B60J 5/04* (2006.01)
(Continued)

(52) U.S. Cl.
CPC ............ *E05D 15/34* (2013.01); *B60J 5/0479* (2013.01); *E05B 83/38* (2013.01); *E05F 15/00* (2013.01);
(Continued)

(58) Field of Classification Search
CPC ...... E05D 15/34; B60J 5/0479; B60J 2005/0475; B60J 5/0477; E05B 83/38; E05B 83/40; E05F 15/00; E05Y 2201/43; E05Y 2201/624; E05Y 2201/686; E05Y 2900/531; E05Y 2201/11; E05Y 2201/22
(Continued)

(56) References Cited

U.S. PATENT DOCUMENTS 6,877,796 B2 * 4/2005 Kimura .................. B60J 7/022
296/210
7,488,029 B2 * 2/2009 Lechkun ............... B60J 5/0479
296/146.1
(Continued)

FOREIGN PATENT DOCUMENTS

DE 3400753 A 8/1984
FR 2866916 A1 * 9/2005 ............ B60J 5/0479
(Continued)

*Primary Examiner* — Amy R Weisberg
*Assistant Examiner* — Dana D Ivey
(74) *Attorney, Agent, or Firm* — Oblon, McClelland, Maier & Neustadt, L.L.P.

(57) ABSTRACT

A vehicle door device includes a first link mechanism formed of first and second link arms having a first rotary coupling point with respect to a vehicle body and a second rotary coupling point with respect to a door of a vehicle, and a second link mechanism formed of the first and second link arms provided independently of the first and second link arms forming the first link mechanism. First and second doors respectively supported by the first and second link mechanisms open and close independently in different directions based on operations of the first and second link mechanisms. At least one of the first and second link arms forming the first link mechanism and the first and second link arms forming the second link mechanism is provided with a coupling length variable mechanism that allows a coupling length between the first and second rotary coupling points to vary.

10 Claims, 13 Drawing Sheets

(51) Int. Cl.
*E05B 83/38* (2014.01)
*E05F 15/00* (2015.01)
E05B 83/40 (2014.01)
E05C 17/60 (2006.01)

(52) U.S. Cl.
CPC ...... *B60J 2005/0475* (2013.01); *B60J 5/0477* (2013.01); *E05B 83/40* (2013.01); *E05C 17/60* (2013.01); *E05Y 2201/11* (2013.01); *E05Y 2201/22* (2013.01); *E05Y 2201/43* (2013.01); *E05Y 2201/624* (2013.01); *E05Y 2201/686* (2013.01); *E05Y 2900/531* (2013.01)

(58) Field of Classification Search
USPC ....................................................... 296/146.1
See application file for complete search history.

(56) References Cited

U.S. PATENT DOCUMENTS

| | | | |
|---|---|---|---|
| 8,226,180 B2* | 7/2012 | Patil | E05F 17/004 |
| | | | 49/109 |
| 2016/0237733 A1* | 8/2016 | Henseleit | E05D 15/30 |
| 2020/0032569 A1 | 1/2020 | Taylor et al. | |
| 2023/0137554 A1* | 5/2023 | Kajino | E05D 3/12 |
| | | | 49/340 |

FOREIGN PATENT DOCUMENTS

| | | |
|---|---|---|
| JP | 2005-325533 A | 11/2005 |
| JP | 2021-31907 A | 3/2021 |

* cited by examiner

SHORTENED STATE

EXTENDED STATE : P0

VEHICLE DOOR DEVICE

CROSS REFERENCE TO RELATED APPLICATIONS

This application is based on and claims priority under 35 U.S.C. § 119 to Japanese Patent Application 2021-207143, filed on Dec. 21, 2021, the entire content of which is incorporated herein by reference.

TECHNICAL FIELD

This disclosure relates to a vehicle door device.

BACKGROUND DISCUSSION

In the related art, some vehicles have so-called double opening doors that are opened and closed in opposite directions. For example, JP 2021-31907A discloses a vehicle including a front door having a rotary fulcrum at a front edge portion of a door opening, and a rear door having a rotary fulcrum at a rear edge portion of the door opening. In the vehicle, a striker provided at a distal end portion of the rear door and a latch provided at a distal end portion of the front door are engaged with each other, so that the front door and the rear door are restrained at a fully closed position. By using such a double opening door, it is possible to secure a large door opening amount and improve getting-on-and-off performance.

However, a swing door as described above, which is opened and closed about a rotary fulcrum provided on a base end side, has a feature that a distal end side thereof protrudes in an opening direction of the door opening as the door opening amount increases. For this reason, for example, in order to avoid interference with an obstacle located in the opening direction of the door opening, such as a wall located in a vehicle width outer direction or a vehicle stopped adjacent thereto, a situation occurs in which the swing door cannot be largely opened. Also in the related art described above, the door opening amount in an actual use situation may be limited.

SUMMARY

According to an aspect of this disclosure, a vehicle door device that solves the above problem includes: a first link mechanism formed of first and second link arms having a first rotary coupling point with respect to a vehicle body and a second rotary coupling point with respect to a door of a vehicle; and a second link mechanism formed of the first and second link arms provided independently of the first and second link arms forming the first link mechanism. A first door supported by the first link mechanism and a second door supported by the second link mechanism are disposed side by side in a door opening formed in the vehicle, and thereby open and close independently in different directions based on operations of the first and second link mechanisms. At least one of the first and second link arms forming the first link mechanism and the first and second link arms forming the second link mechanism is provided with a coupling length variable mechanism that allows a coupling length between the first and second rotary coupling points to vary.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
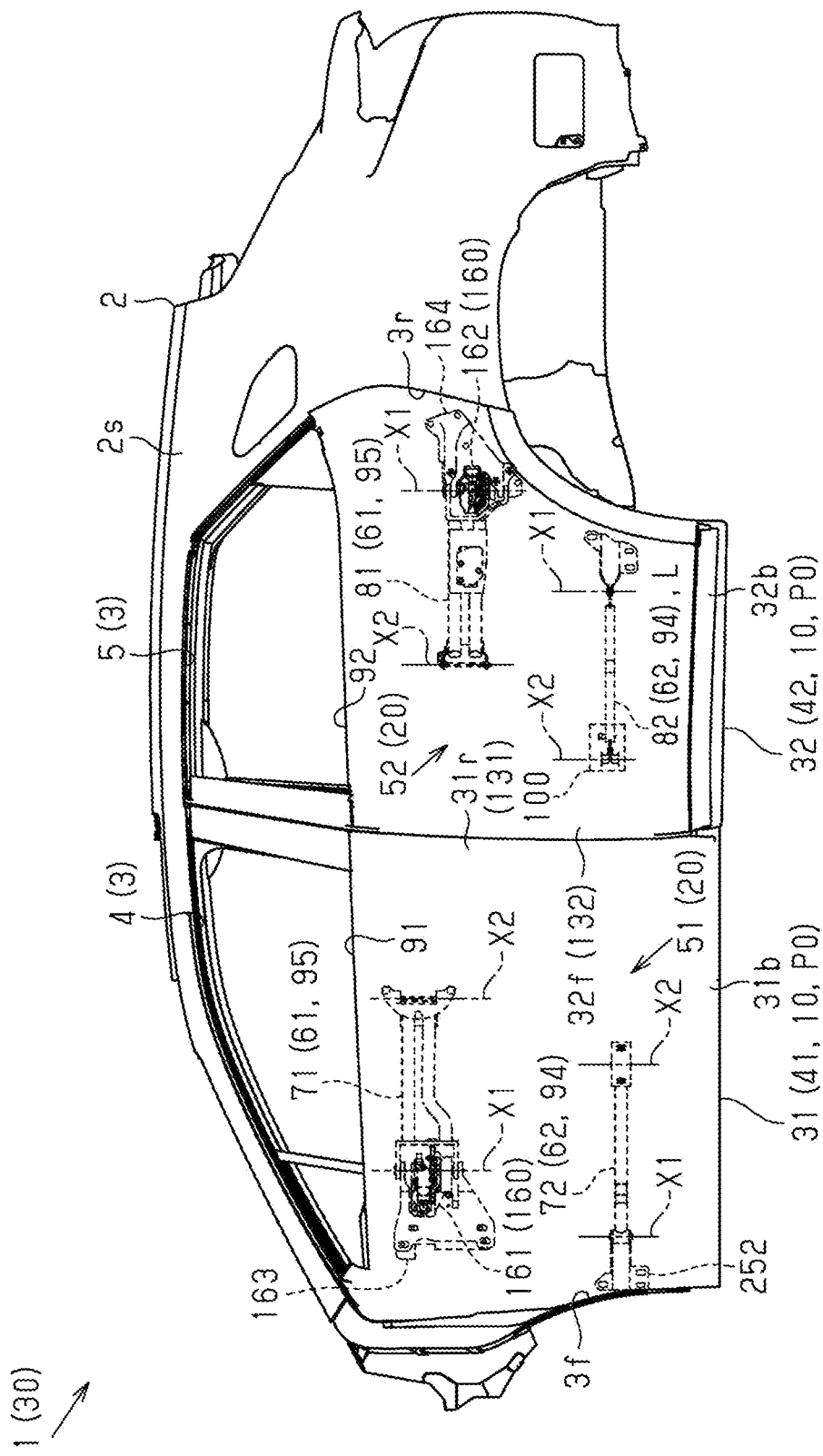
FIG. 1 is a front view of a front door and a rear door that are provided at a door opening of a vehicle.
Figure 2:
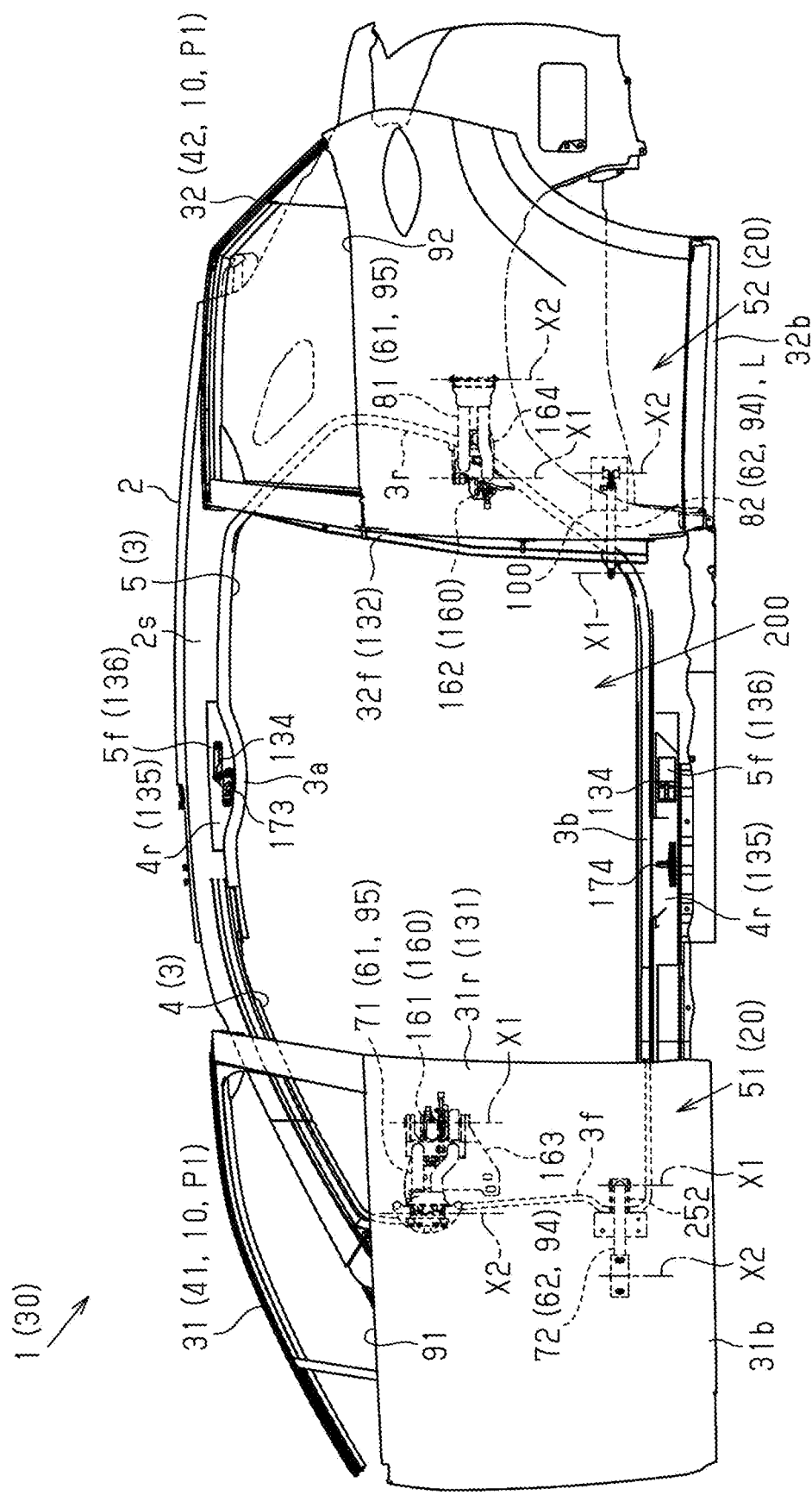
FIG. 2 is a front view of the front door and the rear door that are provided at the door opening of the vehicle.

Hereinafter, an embodiment of a vehicle door device will be described with reference to the drawings.

As shown in FIGS. 1 to 4, a vehicle 1 according to the present embodiment has a door opening 3 formed in a side surface 2s of a vehicle body 2. In the vehicle 1 according to the present embodiment, the door opening 3 does not have a pillar structure at a central portion in a vehicle front-rear direction (a left-right direction in each drawing), and has a so-called pillarless structure in which a front opening 4 and a rear opening 5 are integrated. The vehicle 1 according to the present embodiment includes a pair of doors 10, 10 provided in the door opening 3. In the vehicle 1 according to the present embodiment, the doors 10, 10 are provided side by side in the vehicle front-rear direction, that is, in an opening width direction of the door opening 3. Further, the doors 10, 10 are supported by the vehicle body 2 via link mechanisms 20, 20 provided independently of each other.

Accordingly, in the vehicle 1 according to the present embodiment, based on an operation of the link mechanisms 20, 20, a vehicle door device 30 capable of independently opening and closing the pair of doors 10, 10 provided in the door opening 3 in opposite directions is formed.

That is, in the vehicle 1 according to the present embodiment, the door 10 disposed in the front opening 4 constituting a front portion (a left side in each drawing) of the door opening 3 constitutes a front door 31 of the vehicle 1. The door 10 disposed in the rear opening 5 constituting a rear portion (a right side in each drawing) of the door opening 3 constitutes a rear door 32 of the vehicle 1. Further, in the vehicle door device 30 according to the present embodiment, the front door 31 serves as a first door 41. The link mechanism 20 supporting the first door 41 constitutes a first link mechanism 51. The rear door 32 serves as a second door 42. The link mechanism 20 supporting the second door 42 constitutes a second link mechanism 52.

Specifically, in the vehicle door device 30 according to the present embodiment, each of the link mechanisms 20, 20 includes first and second link arms 61, 62 that are independent from each other. Further, the first and second link arms 61, 62 each have a first rotary coupling point X1 with respect to the vehicle body 2 and a second rotary coupling point X2 with respect to the door 10 of the vehicle 1. Accordingly, in the vehicle door device 30 according to the present embodiment, the link mechanisms 20, 20 constituting the first and second link mechanisms 51, 52 each have a configuration as a four-bar link mechanism independent of each other.

Specifically, first and second link arms 71, 72 forming the first link mechanism 51 each have a first rotary coupling point X1 rotatably coupled to the vehicle body 2 in the vicinity of a front edge portion 3$f$ of the door opening 3. The first and second link arms 71, 72 each have a second rotary coupling point X2 rotatably coupled to the first door 41 constituting the front door 31 of the vehicle 1. Further, first and second link arms 81, 82 forming the second link mechanism 52 each have a first rotary coupling point X1 rotatably coupled to the vehicle body 2 in the vicinity of a rear edge portion 3$r$ of the door opening 3. The first and second link arms 81, 82 each have a second rotary coupling point X2 rotatably coupled to the second door 42 constituting the rear door 32 of the vehicle 1.

In the first and second link mechanisms 51, 52, the first link arms 71, 81 are disposed above the second link arms 72, 82 with which the first link arms 71, 81 are paired. Specifically, the first link arms 71, 81 are disposed at heights below windows 91, 92 of the vehicle 1 formed of the front door 31 and the rear door 32 respectively, that is, near a so-called belt line. The second link arms 72, 82 are disposed at heights in the vicinity of lower end portions 31$b$, 32$b$ of the front door 31 and the rear door 32, respectively.

That is, in the vehicle door device 30 according to the present embodiment, the first link arms 71, 81 have the second rotary coupling points X2 at positions that are closer to centers of gravity of the front door 31 and the rear door 32 than are the second link arms 72, 82. Accordingly, the vehicle door device 30 according to the present embodiment is implemented such that, in both the first and second link mechanisms 51, 52, the first link arms 71, 81 support a larger door load than the second link arms 72, 82.

Specifically, in the vehicle door device 30 according to the present embodiment, each of the second link arms 72, 82 positioned as a sub-link 94 is formed using one shaft-shaped member. On the other hand, each of the first link arms 71, 81 positioned as a main link 95 is formed by coupling two parallel shaft-shaped members. Accordingly, the vehicle door device 30 according to the present embodiment imparts high support rigidity to each of the first link arms 71, 81.

Figure 3:
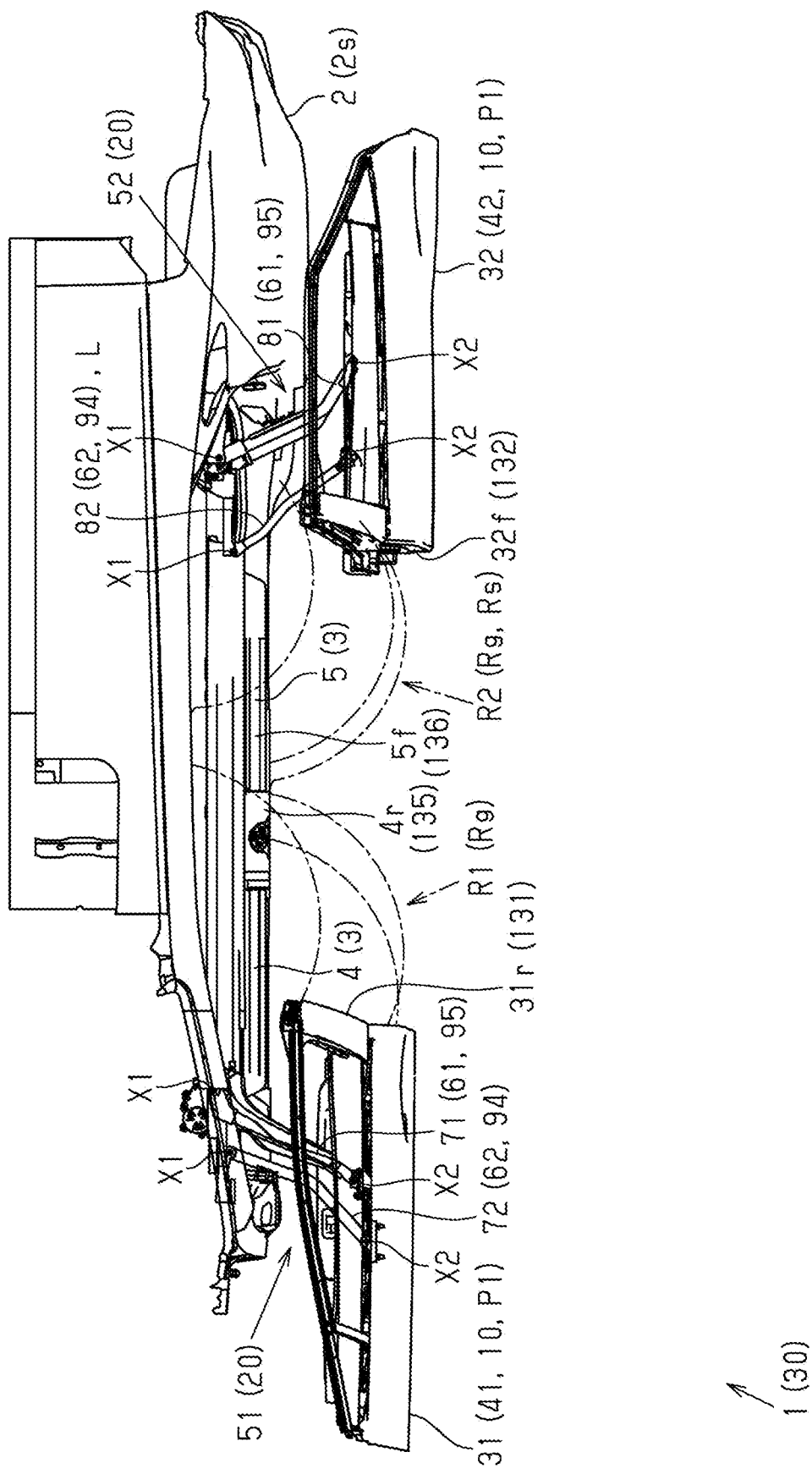
FIG. 3 is a top view of a door device that opens and closes the front door and the rear door of the vehicle.

More specifically, as shown in FIG. 3, in the vehicle door device 30 according to the present embodiment, when the front door 31 is opened, the first and second link arms 71, 72 of the first link mechanism 51 rotate about the first rotary coupling points X1 in a clockwise direction in FIG. 3. Accordingly, in the vehicle door device 30 according to the present embodiment, the front door 31 supported by the first and second link arms 71, 72 is opened toward a vehicle front side.

In the vehicle door device 30 according to the present embodiment, when the front door 31 is closed, the first and second link arms 71, 72 rotate about the first rotary coupling points X1 in a counterclockwise direction in FIG. 3. Accordingly, in the vehicle door device 30 according to the present embodiment, the front door 31 supported by the first and second link arms 71, 72 is closed toward a vehicle rear side.

On the other hand, in the vehicle door device 30 according to the present embodiment, when the rear door 32 is opened, the first and second link arms 81, 82 of the second link mechanism 52 rotate about the first rotary coupling points X1 in the counterclockwise direction in FIG. 3. Accordingly, in the vehicle door device 30 according to the present embodiment, the rear door 32 supported by the first and second link arms 81, 82 is opened toward the vehicle rear side.

Further, in the vehicle door device 30 according to the present embodiment, when the rear door 32 is closed, the first and second link arms 81, 82 rotate about the first rotary coupling points X1 in the clockwise direction in FIG. 3. Accordingly, in the vehicle door device 30 according to the present embodiment, the rear door 32 supported by the first and second link arms 81, 82 is closed toward the vehicle front side.

That is, in the vehicle door device 30 according to the present embodiment, opening and closing trajectories R1 of the front door 31 are defined in a manner of drawing arc-shaped trajectories Rg based on the movement of the first link mechanism 51 formed of the first and second link arms 71, 72. Similarly, opening and closing trajectories R2 of the rear door 32 are defined in a manner of drawing the arc-shaped trajectories Rg based on the movement of the second link mechanism 52 formed of the first and second link arms 81, 82.

That is, in the vehicle door device 30 according to the present embodiment, when the doors 10, 10 supported by the link mechanisms 20, 20 approach a fully closed position P0, the first and second link arms 61, 62 extend in the vehicle front-rear direction. Accordingly, movement components of the doors 10, 10 constituting the front door 31 and the rear door 32 of the vehicle 1 in the vehicle width direction are increased.

At an intermediate opening and closing position where the first and second link arms 61, 62 forming the link mechanisms 20, 20 extend in the vehicle width direction, the movement components of the doors 10, 10 in the vehicle front-rear direction are increased. Accordingly, the vehicle door device 30 according to the present embodiment is implemented such that, when the front door 31 and the rear door 32 of the vehicle 1 are opened and closed, a displacement amount in the vehicle width direction is reduced, thereby avoiding interference with an obstacle and securing a larger door opening amount.

Figure 4:
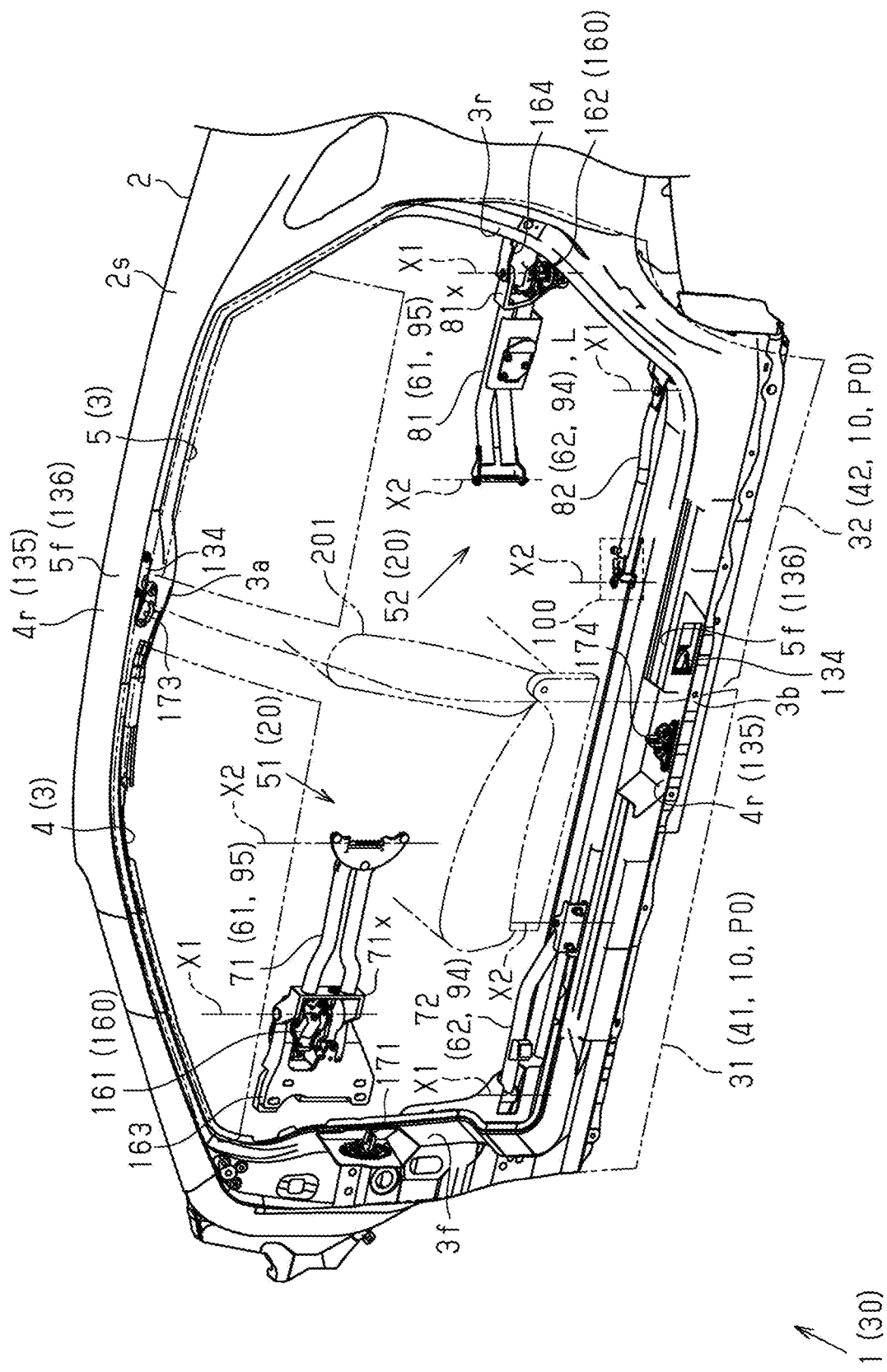
FIG. 4 is a perspective view of the door device that opens and closes the front door and the rear door of the vehicle.
Figure 5:
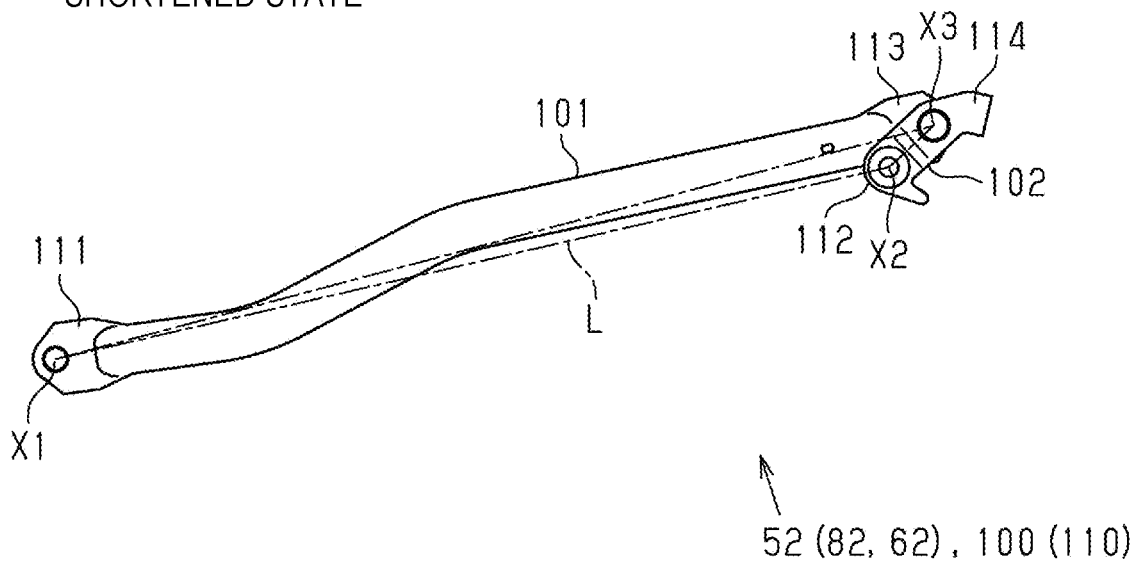
FIG. 5 is a plan view of a joint link mechanism constituting a coupling length variable mechanism.
Figure 6:
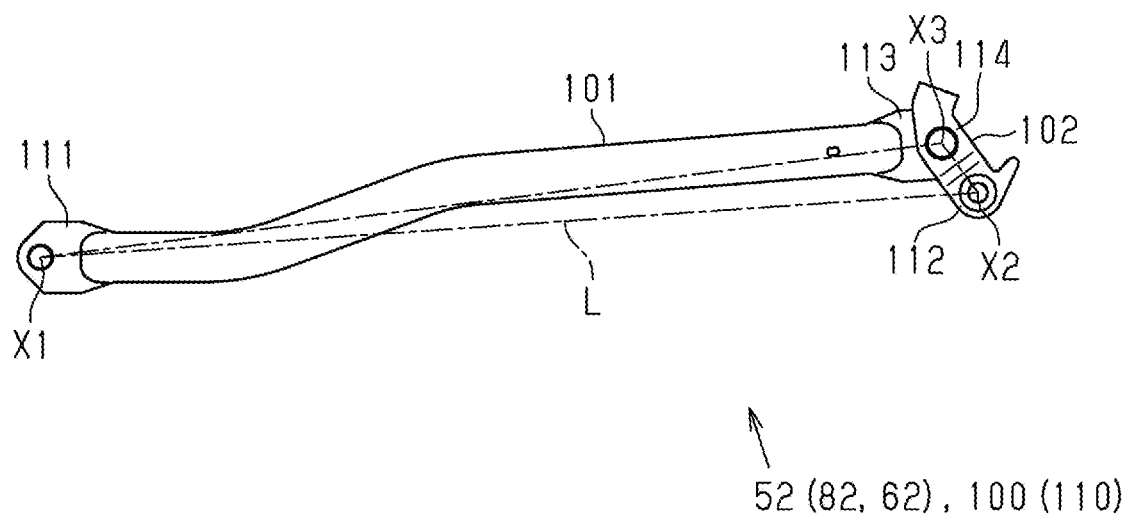
FIG. 6 is a plan view of the joint link mechanism constituting the coupling length variable mechanism.

As shown in FIGS. 4 to 6, in the vehicle door device 30 according to the present embodiment, the second link mechanism 52 supporting the rear door 32 includes a coupling length variable mechanism 100 provided in the second link arm 82. Further, in the vehicle door device 30 according to the present embodiment, a coupling length L between the first and second rotary coupling points X1, X2 of the second link arm 82 on a second link mechanism 52 side can be changed based on an operation of the coupling length variable mechanism 100.

Specifically, as shown in FIGS. 5 and 6, in the vehicle door device 30 according to the present embodiment, the second link arm 82 on the second link mechanism 52 side includes a vehicle body side link 101 and a door side link 102. That is, the vehicle body side link 101 has the first rotary coupling point X1 with respect to the vehicle body 2. The door side link 102 has the second rotary coupling point X2 with respect to the rear door 32 of the vehicle 1. Further, the second link arm 82 on the second link mechanism 52 side has a configuration in which the vehicle body side link 101 and the door side link 102 are rotatably coupled to each other. In the vehicle door device 30 according to the present embodiment, a joint link mechanism 110 formed thereby functions as the coupling length variable mechanism 100.

Specifically, the door side link 102 according to the present embodiment has a configuration as a so-called mini-arm whose axial length is shorter than that of the vehicle body side link 101. The vehicle body side link 101 includes a vehicle body side coupling portion 111 with respect to the vehicle body 2 on one end side of the vehicle body side link 101 in a longitudinal direction. Further, the door side link 102 also includes a door side coupling portion 112 with respect to the door 10 on one end side of the door side link 102 in the longitudinal direction. The vehicle body side link 101 and the door side link 102 respectively have intermediate coupling portions 113, 114 coupled to each other on the other end sides in the longitudinal direction.

That is, in the vehicle door device 30 according to the present embodiment, the intermediate coupling portions 113, 114 form an intermediate coupling point X3 of the joint link mechanism 110 provided in the second link arm 82 on the second link mechanism 52 side. In the second link arm 82, the vehicle body side link 101 and the door side link 102 form a triangle with the intermediate coupling point X3 as a vertex. Accordingly, the vehicle body side link 101 and the door side link 102 rotate relative to each other. Therefore, a length of a straight line connecting the first and second rotary coupling points X1, X2 serving as a base of the triangle, that is, the coupling length L of the straight line changes.

In the vehicle door device 30 according to the present embodiment, a biasing member (not shown) applies a biasing force to the joint link mechanism 110 constituting the coupling length variable mechanism 100 to relatively rotate the vehicle body side link 101 and the door side link 102 about the intermediate coupling point X3. That is, the coupling length variable mechanism 100 according to the present embodiment is biased in a direction to shorten the coupling length L of the rear door 32 by the second link arm 82 on the second link mechanism 52 side provided with the coupling length variable mechanism 100. Accordingly, in the vehicle door device 30 according to the present embodiment, the rear door 32 is opened and closed in a state in which the coupling length L is shortened by the second link arm 82, except for a case in which the rear door 32, which will be described in detail below, is in the vicinity of the fully closed position P0.

As shown in FIGS. 4 to 7, in the vehicle door device 30 according to the present embodiment, the opening and closing trajectory R2 of the rear door 32 changes based on the operation of the coupling length variable mechanism 100 provided in the second link arm 82 on the second link mechanism 52 side. Specifically, when the rear door 32 is in the vicinity of the fully closed position P0, the opening and closing trajectory R2 of the rear door 32 changes to a linear trajectory Rs. Accordingly, the vehicle door device 30 according to the present embodiment is implemented such that the front door 31 and the rear door 32, which are independently opened and closed, do not interfere with each other based on the operations of the first and second link mechanisms 51, 52.

More specifically, in the vehicle 1 according to the present embodiment, the front door 31 is closed toward the vehicle rear side with a rear end portion 31r of the front door 31 as a closing end portion 131. The rear door 32 is closed toward the vehicle front side with a front end portion 32f of the rear door 32 as a closing end portion 132. Further, the front door 31 and the rear door 32 are disposed at the fully closed position P0 in a state in which a closing end portion tip end 131x of the front door 31 and a closing end portion tip end 132x of the rear door 32 overlap each other in the vehicle width direction.

Figure 7:
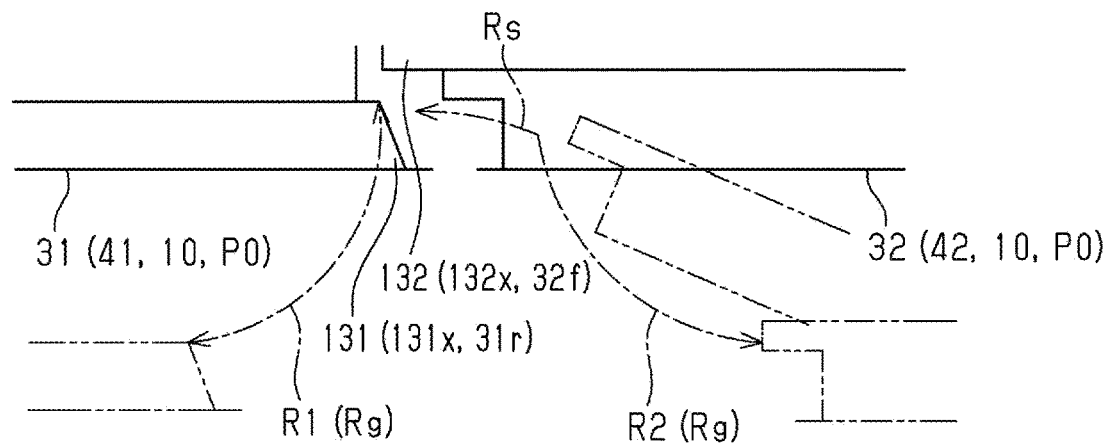
FIG. 7 is an explanatory view showing an opening and closing trajectory of the front door and the rear door in the vicinity of a fully closed position.

Specifically, in the vehicle 1 according to the present embodiment, the closing end portion tip end 132x on a rear door 32 side located at the front end portion 32f of the rear door 32 is disposed on an inner side in the vehicle width direction (an upper side in FIG. 7). The closing end portion tip end 131x on a front door 31 side located at the rear end portion 31r of the front door 31 is disposed on an outer side in the vehicle width direction (a lower side in FIG. 7) with respect to the closing end portion tip end 132x on the rear door 32 side. Therefore, when it is assumed that both of the front door 31 and the rear door 32 are opened and closed on the arc-shaped trajectory Rg based on the rotation of the first and second link arms 61, 62 even in the vicinity of the fully closed position P0, the doors 10, 10 interfere with each other.

That is, in such an assumption, when the rear door 32 located at the fully closed position P0 is opened, the front door 31 having the closing end portion tip end 131x disposed on an outer side in the vehicle width direction with respect to the closing end portion tip end 132x of the rear door 32 needs to be opened from the fully closed position P0 first. Further, when the front door 31 is fully closed, the rear door 32 needs to be in the fully closed state before the front door 31 is fully closed.

In consideration of this point, in the vehicle door device 30 according to the present embodiment, as described above, when the rear door 32 is located in the vicinity of the fully closed position P0, the opening and closing trajectory R2 of the rear door 32 changes based on the operation of the coupling length variable mechanism 100. Specifically, in the vehicle door device 30 according to the present embodiment, when the rear door 32 is fully closed, the rear door 32 moves to the fully closed position P0 in such a manner that the closing end portion tip end 132x of the rear door 32 draws the linear trajectory Rs from the vehicle rear side to the front side (from the right side to the left side in FIG. 7). When the rear door 32 is opened from the fully closed state, the rear door 32 moves from the fully closed position P0 in such a manner that the closing end portion tip end 132x of the rear door 32 similarly draws the linear trajectory Rs from the vehicle front side to the rear side (from the left side to the right side in FIG. 7). Accordingly, in the vehicle door device 30 according to the present embodiment, the front door 31 and the rear door 32 of the vehicle 1 can be opened and closed independently of each other without an order restriction when it is assumed that both of the front door 31 and the rear door 32 are opened and closed along the arc-shaped trajectory Rg as described above.

Figure 8:
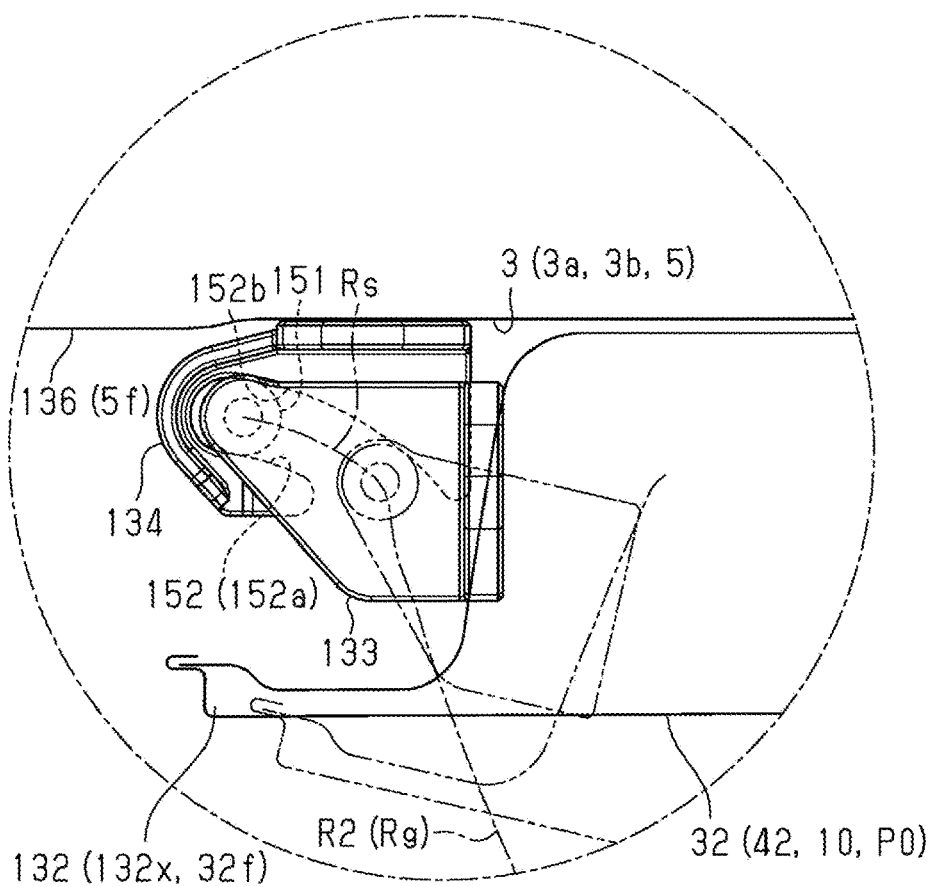
FIG. 8 is a schematic configuration diagram of a door side engagement portion and a vehicle body side engagement portion.
Figure 9:
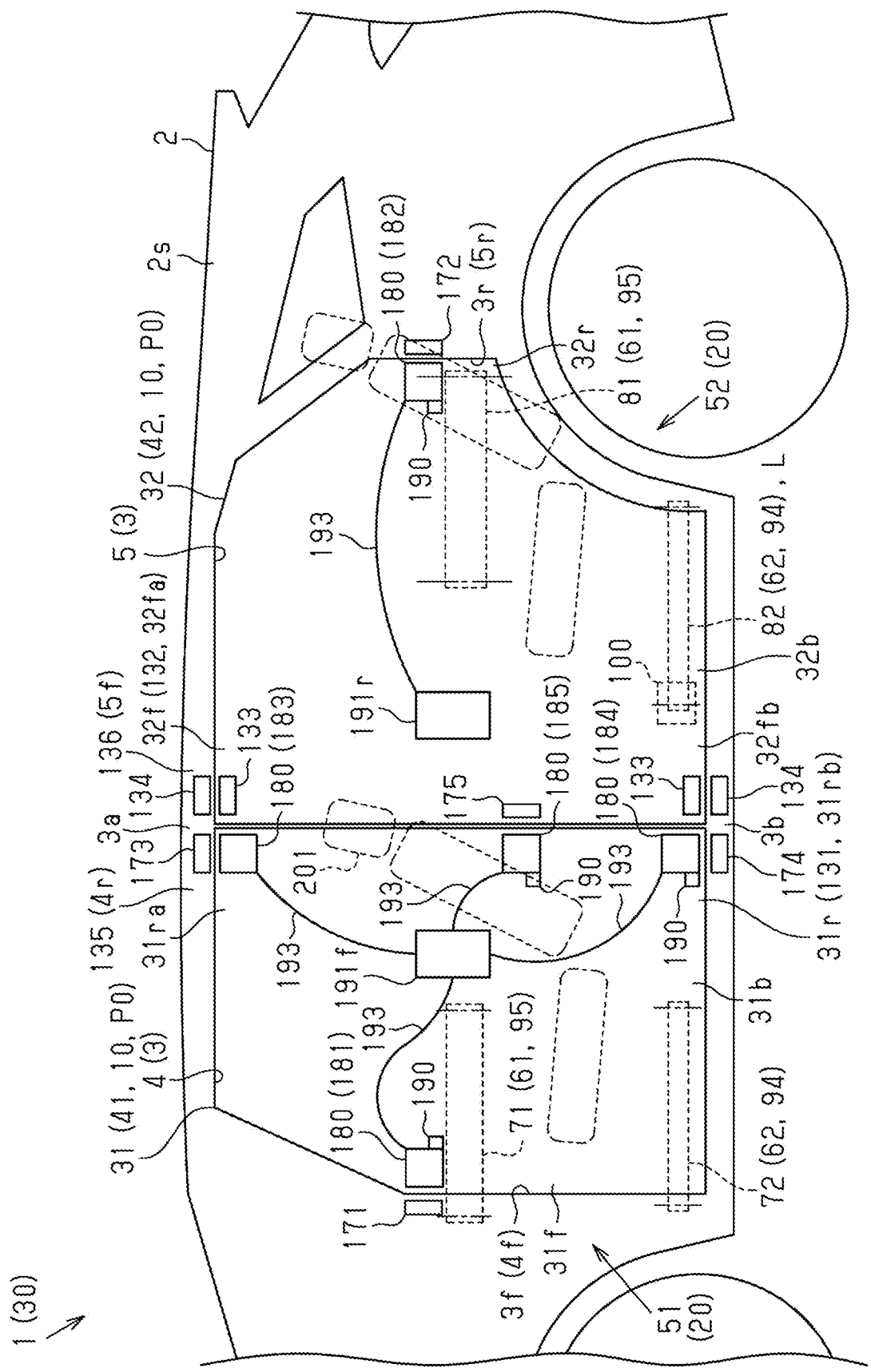
FIG. 9 is a schematic configuration diagram of a door lock system that restrains the front door and the rear door at the fully closed position.

More specifically, as shown in FIGS. 4, 8, and 9, the vehicle door device 30 according to the present embodiment includes a door side engagement portion 133 provided at the closing end portion 132 of the rear door 32. The vehicle door device 30 includes a vehicle body side engagement portion 134 provided at a position corresponding to a front end 5f of the rear opening 5 constituting the door opening 3 of the vehicle 1, that is, at a substantially central position in the opening width direction of the door opening 3 extending in the vehicle front-rear direction. Further, in the vehicle door device 30 according to the present embodiment, when the rear door 32 is in the vicinity of the fully closed position P0, the door side engagement portion 133 and the vehicle body side engagement portion 134 are engaged with each other.

Specifically, as shown in FIGS. 4 and 9, the vehicle door device 30 according to the present embodiment includes a pair of door side engagement portions 133, 133 provided at an upper end portion 32fa and a lower end portion 32fb of the front end portion 32f of the rear door 32, which is the closing end portion 132 of the rear door 32. The vehicle door device 30 includes a pair of vehicle body side engagement portions 134, 134 that are provided at an upper edge portion 3a and a lower edge portion 3b of the door opening 3 at the substantially central position in the opening width direction of the door opening 3.

That is, in the vehicle 1 according to the present embodiment, the substantially central position in the opening width direction of the door opening 3 extending in the vehicle front-rear direction is the position of a rear end 4r of the front opening 4 and the front end 5f of the rear opening 5. Further, in the vehicle door device 30 according to the present embodiment, the substantially central position corresponds to the closing end portions 135, 136 of the door opening 3 in which the front door 31 and the rear door 32 are provided side by side in the opening width direction.

That is, the door opening 3 according to the present embodiment has the so-called pillarless structure as described above. Therefore, the vehicle door device 30 according to the present embodiment is implemented such that the vehicle body side engagement portions 134, 134 are provided at the upper edge portion 3a and the lower edge portion 3b of the door opening 3.

Figure 10:
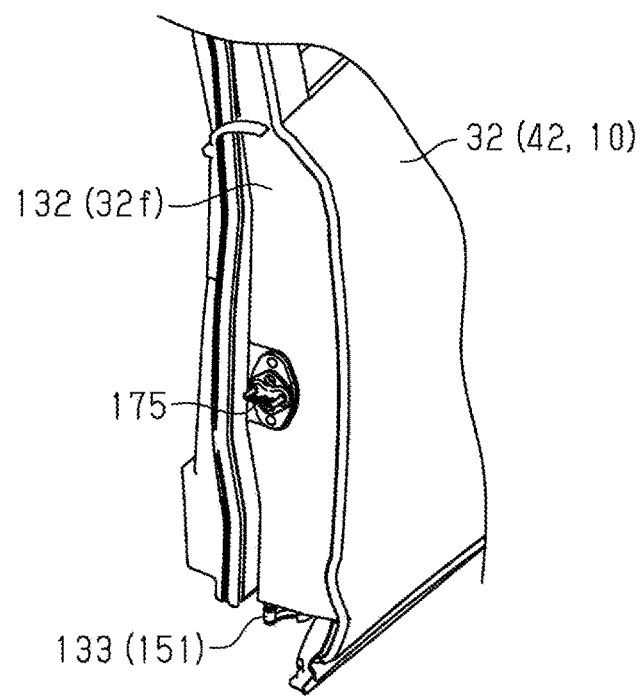
FIG. 10 is a perspective view of the vicinity of a front end portion of the rear door.
Figure 11:
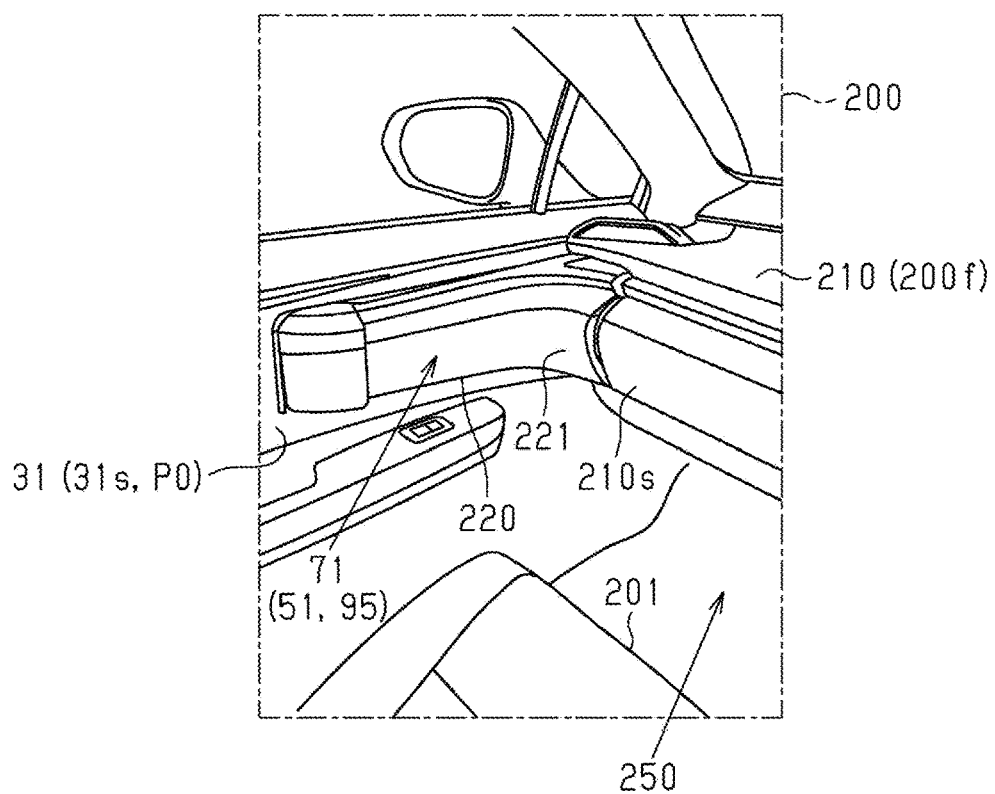
FIG. 11 is an external view of a vehicle interior in the vicinity of a front door supported by a link mechanism formed of first and second link arms and a dash panel disposed at a front portion of the vehicle interior.

As shown in FIGS. 8 and 10, in the vehicle door device 30 according to the present embodiment, the door side engagement portion 133 includes a shaft-shaped engagement portion 151 that extends in an upper-lower direction (a direction orthogonal to a paper surface in FIG. 8) of the vehicle 1. Further, the vehicle body side engagement portion 134 has a guide groove 152 having a pair of side wall portions 152a, 152b facing each other in the vehicle width direction (an upper-lower direction in FIG. 8) and extending in an opening and closing direction of the rear door 32. Further, in the vehicle door device 30 according to the present embodiment, when the rear door 32 is in the vicinity of the fully closed position P0, the door side engagement portion 133 and the vehicle body side engagement portion 134 are engaged with each other in a state in which the shaft-shaped engagement portion 151 is disposed in the guide groove 152.

That is, the shaft-shaped engagement portion 151 of the door side engagement portion 133 is disposed in the guide groove 152 of the vehicle body side engagement portion 134, in a state of being sandwiched between the pair of side wall portions 152a, 152b facing each other in the vehicle width direction. Therefore, the displacement of the rear door 32 in the vehicle width direction is restricted. Accordingly, the vehicle door device 30 according to the present embodiment can stably support the rear door 32 even in the vicinity of the fully closed position P0 where the first and second link arms 81, 82 forming the second link mechanism 52 are likely to be aligned.

Further, in the vehicle door device 30 according to the present embodiment, the opening and closing of the rear door 32 in the state in which the door side engagement portion 133 and the vehicle body side engagement portion 134 are engaged with each other is allowed based on the operation of the coupling length variable mechanism 100 provided in the second link arm 82. Specifically, when the rear door 32 is opened and closed in the state in which the door side engagement portion 133 and the vehicle body side engagement portion 134 are engaged with each other, the shaft-shaped engagement portion 151 is relatively displaced along an extending direction of the guide groove 152 while the coupling length L is changed based on the operation of the coupling length variable mechanism 100. Accordingly, in the vehicle door device 30 according to the present embodiment, the opening and closing trajectory R2 of the rear door 32 changes. That is, the arc-shaped trajectory Rg based on the operation of the second link mechanism 52 is changed to the linear trajectory Rs along the opening width direction of the door opening 3.

In the vehicle door device 30 according to the present embodiment, on a first link mechanism 51 side supporting the front door 31 of the vehicle 1, the coupling length variable mechanism 100 is not provided in any of the first and second link arms 71, 72. That is, in the vehicle door device 30 according to the present embodiment, even when the front door 31 is in the vicinity of the fully closed position P0, the front door 31 is opened and closed while drawing the arc-shaped trajectory Rg based on the rotation of the first and second link arms 71, 72. Accordingly, in the vehicle 1 according to the present embodiment, the front door 31 located in the vicinity of the fully closed position P0 is opened and closed in a manner of being displaced in the vehicle width direction.

That is, when the front door 31 is opened from the fully closed position P0, the rear end portion 311, which is the closing end portion 131 of the front door 31, is displaced in the outer side in the vehicle width direction while being displaced toward the vehicle front side. On the other hand, when the front door 31 is closed to the fully closed position P0, the rear end portion 31r, which serves as the closing end portion 131 of the front door 31, is displaced in the inner side in the vehicle width direction while being displaced toward the vehicle rear side. Accordingly, the vehicle door device 30 according to the present embodiment can open the front door 31 of the vehicle 1 from the fully closed position P0 and close the front door 31 to the fully closed position P0 with an operation feeling similar to that of a general swing door.

As shown in FIGS. 1 to 4, the vehicle door device 30 according to the present embodiment has a configuration as a so-called power door device capable of opening and closing the front door 31 and the rear door 32 of the vehicle 1 based on a driving force of an actuator 160.

Specifically, the vehicle door device 30 according to the present embodiment includes a first actuator 161 that applies the driving force to the first link mechanism 51 to open and close the first door 41 supported by the first link mechanism 51. The vehicle door device 30 further includes a second actuator 162 that applies the driving force to the second link mechanism 52 to open and close the second door 42 supported by the second link mechanism 52. In the vehicle door device 30 according to the present embodiment, the front door 31 serving as the first door 41 and the rear door 32 serving as the second door 42 are independently opened and closed by operations of the first and second actuators 161, 162.

Specifically, the first and second actuators 161, 162 each have a motor serving as a drive source thereof. The first and second actuators 161, 162 are provided at the first rotary coupling points X1, X1 of the first link arms 71, 81, respectively, in the corresponding first and second link mechanisms 51, 52.

Specifically, the first actuator 161 is provided at a base end portion 71x of the first link arm 71 having the first rotary coupling point X1 with respect to the vehicle body 2 in a state in which the first actuator 161 is fixed to the vehicle body 2. Specifically, the first actuator 161 is provided at a position where the base end portion 71x of the first link arm 71 and a coupling bracket 163 that allows the base end portion 71x to rotate with respect to the vehicle body 2 are coupled. Accordingly, the first actuator 161 is implemented such that a driving force for rotating the first link arm 71 on the first link mechanism 51 side about the first rotary coupling point X1 with respect to the vehicle body 2 is applied.

Similarly, the second actuator 162 is also provided at a base end portion 81x of the first link arm 81 having the first rotary coupling point X1 with respect to the vehicle body 2 in a state in which the second actuator 162 is fixed to the vehicle body 2. Specifically, the second actuator 162 is provided at a position where the base end portion 81x of the first link arm 81 and a coupling bracket 164 that allows the base end portion 81x to rotate with respect to the vehicle body 2 are coupled. Accordingly, in the second actuator 162, a driving force for rotating the first link arm 81 on the second link mechanism 52 side about the first rotary coupling point X1 with respect to the vehicle body 2 is applied.

Further, in the vehicle door device 30 according to the present embodiment, independent control signals are input to the first and second actuators 161, 162, respectively. Accordingly, in the vehicle 1 according to the present embodiment, the front door 31 supported by the first link mechanism 51 and the rear door 32 serving as the second door 42 supported by the second link mechanism 52 are opened and closed independently of each other.

Door Lock System

Next, a door lock system of the vehicle 1 formed of the vehicle door device 30 according to the present embodiment will be described.

As shown in FIGS. 4, 9, and 10, the vehicle door device 30 according to the present embodiment includes strikers 171, 172 provided at the front edge portion 3f and the rear edge portion 3r of the door opening 3. The vehicle door device 30 includes a pair of upper and lower strikers 173, 174 separately provided at the upper edge portion 3a and the lower edge portion 3b of the door opening 3 at the substantially central position in the opening width direction of the door opening 3. Specifically, the strikers 173, 174 are provided at the closing end portion 135 of the door opening 3 where the front door 31 is disposed. The vehicle door device 30 further includes a striker 175 provided at the front end portion 32f of the rear door 32. Accordingly, the vehicle door device 30 according to the present embodiment includes a plurality of lock devices 180 that engage with the strikers 171 to 175 to restrain the front door 31 and the rear door 32 that are provided in the door opening 3 at the fully closed position P0.

Specifically, as shown in FIG. 9, the vehicle door device 30 according to the present embodiment includes, as the lock device 180, a front lock 181 provided at a front end portion 31f of the front door 31. Similarly, the vehicle door device 30 includes, as the lock device 180, a rear lock 182 provided at a rear end portion 32r of the rear door 32. Further, the vehicle door device 30 includes, as the lock devices 180, an upper lock 183 provided at an upper end portion 31ra of the rear end portion 31r of the front door 31, and a lower lock 184 provided at a lower end portion 31rb of the rear end portion 31r of the front door 31. The vehicle door device 30 according to the present embodiment includes, as the lock device 180, a center lock 185 provided at the rear end portion 31r of the front door 31 at a position in the upper-lower direction between the upper lock 183 and the lower lock 184.

That is, in the vehicle 1 according to the present embodiment, when the front door 31 is closed to the fully closed position P0, the lock devices 180 provided at the front door 31 are engaged with the corresponding strikers 171, 173, 174. Specifically, the front lock 181 provided at the front end portion 31f of the front door 31 is engaged with the striker 171 provided at the front edge portion 3f of the door opening 3, that is, at a position corresponding to a front end 4f of the front opening 4. The upper lock 183 and the lower lock 184 provided at the rear end portion 31r of the front door 31 separately engage with the upper and lower strikers 173, 174 provided at the upper edge portion 3a and the lower edge portion 3b of the door opening 3 at positions corresponding to the rear end 4r of the front opening 4. In the vehicle 1 according to the present embodiment, the strikers 173, 174 are similarly disposed on the vehicle front side of the vehicle body side engagement portions 134, 134 that are provided on the upper edge portion 3a and the lower edge portion 3b of the door opening 3. Further, in the vehicle 1 according to the present embodiment, the front door 31 is held in the fully closed state based on an engagement force between the strikers 171, 173, 174 and the front lock 181, the upper lock 183, and the lower lock 184.

When the rear door 32 is closed to the fully closed position P0, the rear lock 182 provided at the rear end portion 32r of the rear door 32 is engaged with the striker 172 provided at the rear edge portion 3r of the door opening 3, that is, at a position corresponding to a rear end 5r of the rear opening 5. Further, in the vehicle 1 according to the present embodiment, the rear door 32 is held in the fully closed state based on an engagement force of the rear lock 182 and the striker 172 and an engagement force of the door side engagement portions 133, 133 and the vehicle body side engagement portions 134, 134.

Further, in the vehicle 1 according to the present embodiment, when both the front door 31 and the rear door 32 are in the fully closed state, the center lock 185 provided in the front door 31 is engaged with the striker 175 provided in the rear door 32. That is, the lock device 180 provided at the closing end portion 131 of the front door 31 engages with the striker 175 provided at the closing end portion 132 of the rear door 32. Accordingly, the vehicle 1 according to the present embodiment is implemented such that the front door 31 and the rear door 32 are restrained at the fully closed position P0 based on an engagement force of the center lock 185 and the striker 175.

More specifically, in the vehicle door device 30 according to the present embodiment, the lock devices 180 each include a latch mechanism (not shown) that has two engagement states which are a half-latched state and a full-latched state. Each of the lock devices 180 other than the upper lock 183 includes a motor 190 serving as a drive source. That is, each of the lock devices 180 has a function of shifting the latch mechanism from the half-latched state to the full-latched state and shifting the latch mechanism from the full-latched state to an unlatched state, that is, a non-engaged state, by motor driving. Further, the vehicle door device 30 according to the present embodiment is implemented such that the lower lock 184 and the upper lock 183 having the drive source thereof are interlocked with each other by cable coupling via a remote controller 191*f*. Further, the vehicle door device 30 according to the present embodiment releases, by the operation of the lock devices 180, the restraint of the front door 31 and the rear door 32 in response to an opening request when the door is opened from the fully closed position P0.

Specifically, in the vehicle 1 according to the present embodiment, a control signal for each lock device 180 having the motor 190 serving as the drive source is individually input via an in-vehicle network (not shown).

For example, when an opening request of the rear door 32 is made based on an operation input to an operation switch provided in the vehicle 1 or a portable device held by a user, a lock release signal is input to the lock device 180 provided in the rear door 32, that is, the rear lock 182. At this time, the lock release signal is also input to the lock device 180 that engages with the striker 175 provided at the front end portion 32*f* of the rear door 32, that is, the center lock 185, among the lock devices 180 provided at the rear end portion 31*r* of the front door 31. Accordingly, the vehicle door device 30 according to the present embodiment is implemented such that the rear lock 182 and the center lock 185 perform an unlock operation, thereby allowing the opening of the rear door 32 in the fully closed state.

On the other hand, when an opening request of the front door 31 is made, the lock release signal is input to the lock devices 180 with the drive source provided in the front door 31, that is, the front lock 181, the lower lock 184, and the center lock 185. Accordingly, the vehicle door device 30 according to the present embodiment is implemented such that the three lock devices 180 perform the unlock operation, and the upper lock 183 is interlocked to perform the unlock operation, thereby allowing the opening of the front door 31 in the fully closed state.

In the vehicle door device 30 according to the present embodiment, in addition to the upper lock 183 and the lower lock 184, the front lock 181 and the center lock 185 are also coupled to the remote controller 191*f* provided on the front door 31 via a transmission cable 193. Similarly, the rear lock 182 on the rear door 32 side is coupled to a remote controller 191*r* provided on the rear door 32 via a transmission cable 193. Accordingly, the vehicle door device 30 according to the present embodiment is implemented such that each of the lock devices 180 performs the unlock operation based on an operation of the remote controllers 191*f*, 191*r* coupled via the transmission cable 193 without depending on the motor driving.

Specifically, the vehicle 1 according to the present embodiment includes emergency levers (not shown) provided on the front door 31 and the rear door 32. In the vehicle door device 30 according to the present embodiment, operation inputs to the emergency levers are separately input to the remote controller 191*f* on the front door 31 side and the remote controller 191*r* on the rear door 32 side on which the respective emergency levers are provided. That is, in the vehicle 1 according to the present embodiment, the emergency levers are operated at, for example, the time of power loss such as so-called battery exhaustion. Further, the operation inputs to the emergency levers are separately transmitted to the lock devices 180 provided in the front door 31 and the rear door 32 via the corresponding remote controllers 191*f*, 191*r*. Accordingly, the vehicle door device 30 according to the present embodiment can manually release the restraint of the front door 31 and the rear door 32 that are held in the fully closed state.

Front Door and First Link Mechanism

Next, the first link mechanism 51 supporting the front door 31 of the vehicle 1 will be described.

As shown in FIGS. 4 and 11 to 13, in the vehicle 1 according to the present embodiment, the first door 41 constituting the front door 31 of the vehicle 1 is disposed in the front opening 4 of the door opening 3 while being supported by the first link mechanism 51. Accordingly, the vehicle door device 30 according to the present embodiment is implemented such that the front door 31 is opened and closed on the outer side in the vehicle width direction of a front seat 201 provided in a vehicle interior 200 based on the operation of the first link mechanism 51.

That is, as described above, the first and second link arms 71, 72 forming the first link mechanism 51 each have the first rotary coupling point X1 rotatably coupled to the vehicle body 2 in the vicinity of the front edge portion 3*f* of the door opening 3.

Specifically, as shown in FIGS. 11 to 14, the vehicle 1 according to the present embodiment includes a front portion 200*f* of the vehicle interior 200 and a dash panel 210 provided at a position in front of a front seat 201 of the front portion 200*f*. Further, in the vehicle door device 30 according to the present embodiment, the first link arm 71 constituting the main link 95 of the first link mechanism 51 has the first rotary coupling point X1 with respect to the vehicle body 2 inside the dash panel 210. Specifically, in the vehicle door device 30 according to the present embodiment, the base end portion 71*x* of the first link arm 71 and the coupling bracket 163 forming the first rotary coupling point X1 with respect to the vehicle body 2 are disposed inside the dash panel 210. Accordingly, in the vehicle door device 30 according to the present embodiment, the first link arm 71 rotates in a state in which the first rotary coupling point X1 and the first actuator 161 provided at the first rotary coupling point X1 are hidden in the dash panel 210. That is, the front door 31 of the vehicle 1 coupled to the first link arm 71 is opened and closed.

The vehicle door device 30 according to the present embodiment includes a link cover 220 that rotates together with with the first link arm 71 in a state of covering the first link arm 71 constituting the first link mechanism 51. In the vehicle door device 30 according to the present embodiment, the link cover 220 is implemented using a soft material, such as resin or sponge, similar to a door trim constituting an inner side surface 31*s* of the front door 31. The link cover 220 according to the present embodiment covers an outer periphery of the first link arm 71 over the entire length of the first link arm 71 from the first rotary coupling point X1 with respect to the vehicle body 2 to the second rotary coupling point X2 with respect to the front door 31. Further, in the vehicle door device 30 according to the present embodiment, when the front door 31 is in the fully closed state, the link cover 220 is continuously and integrally disposed with the inner side surface 31*s* of the front door 31 and the dash panel 210.

Figure 13:
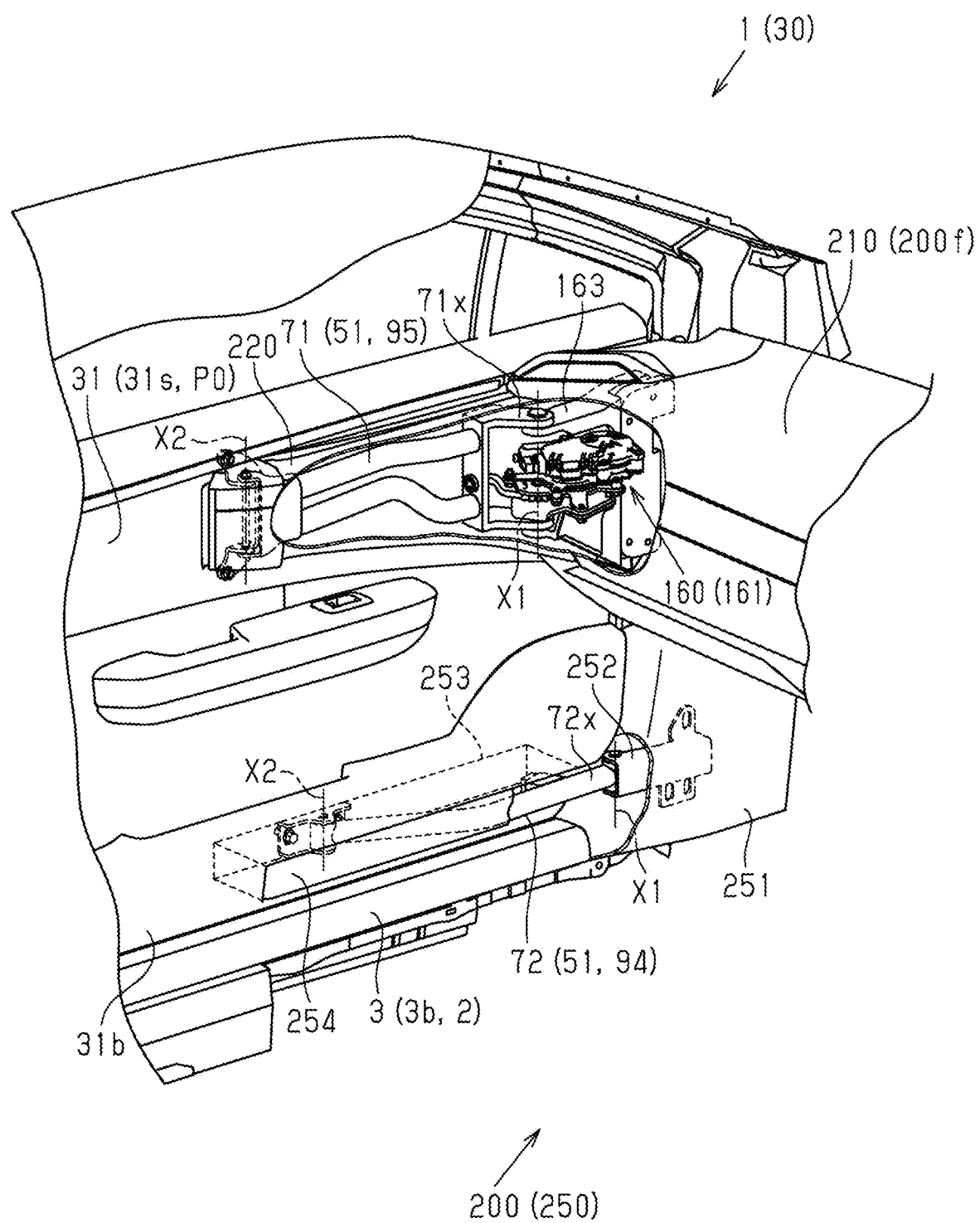
FIG. 13 is an external view of the vicinity of the front door and the dash panel with a partial cross section showing the arrangement of the first and second link arms.
Figure 14:
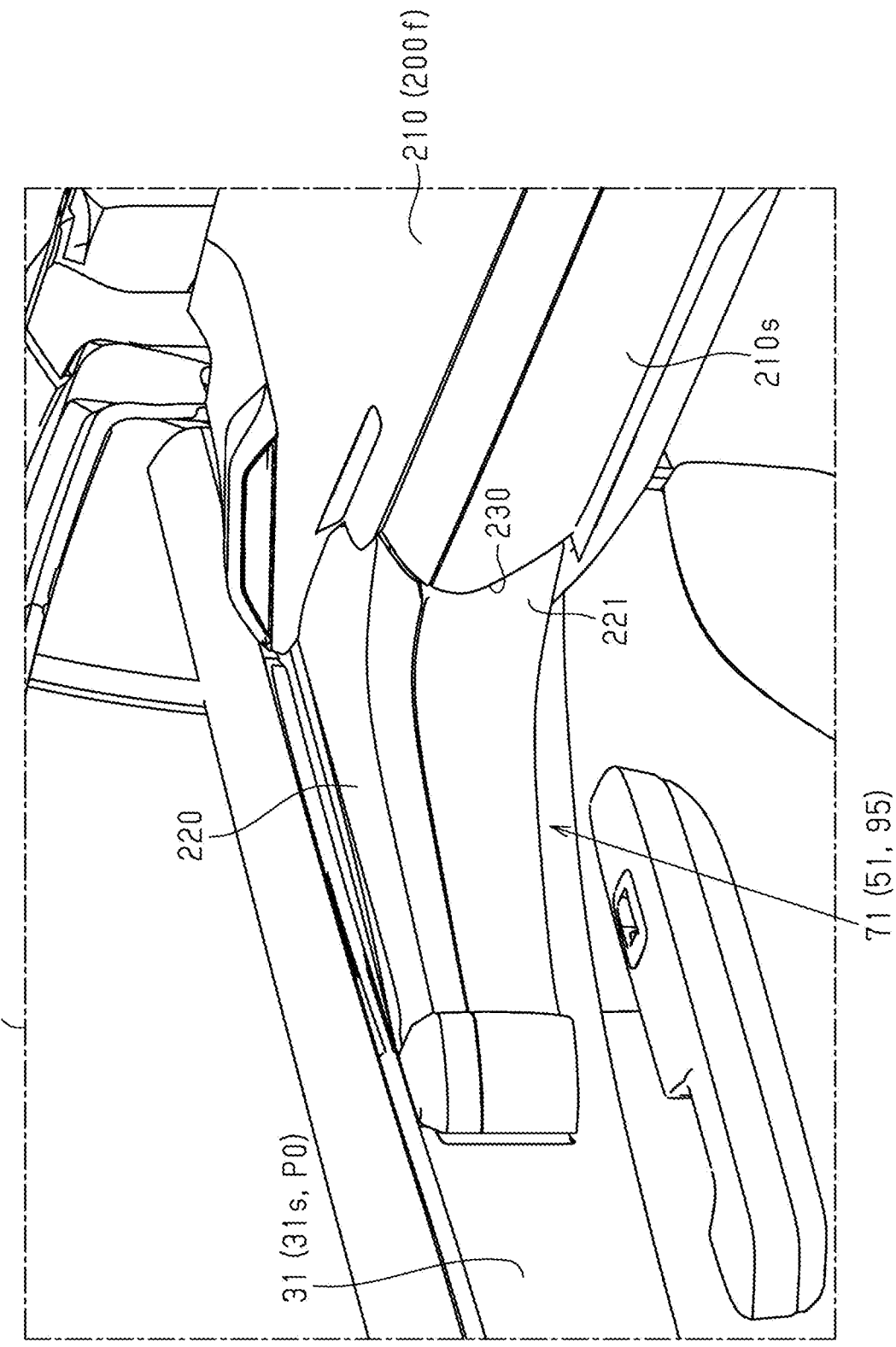
FIG. 14 is an external view of the vehicle interior showing a positional relationship among the front door, a link cover, and the dash panel when the front door is in a fully closed state.

That is, as shown in FIGS. 13 and 14, in the vehicle door device 30 according to the present embodiment, when the front door 31 is in the fully closed state, the first and second link arms 71, 72 of the first link mechanism 51 supporting the front door 31 extend in the vehicle front-rear direction. Accordingly, the link cover 220 covering the first link arm 71 is disposed along the inner side surface 31s of the front door 31. In this state, the link cover 220 according to the present embodiment is designed to be integrated with the inner side surface 31s of the front door 31.

Further, in the link cover 220 according to the present embodiment, a portion covering the base end portion 71x of the first link arm 71 having the first rotary coupling point X1 with respect to the vehicle body 2 has a substantially L-shaped curved shape. Accordingly, the vehicle door device 30 according to the present embodiment is implemented such that, when the front door 31 is in the fully closed state, a base end portion 221 of the link cover 220 is continuously disposed on a design surface 210s of the dash panel 210 extending in the vehicle width direction.

Figure 12:
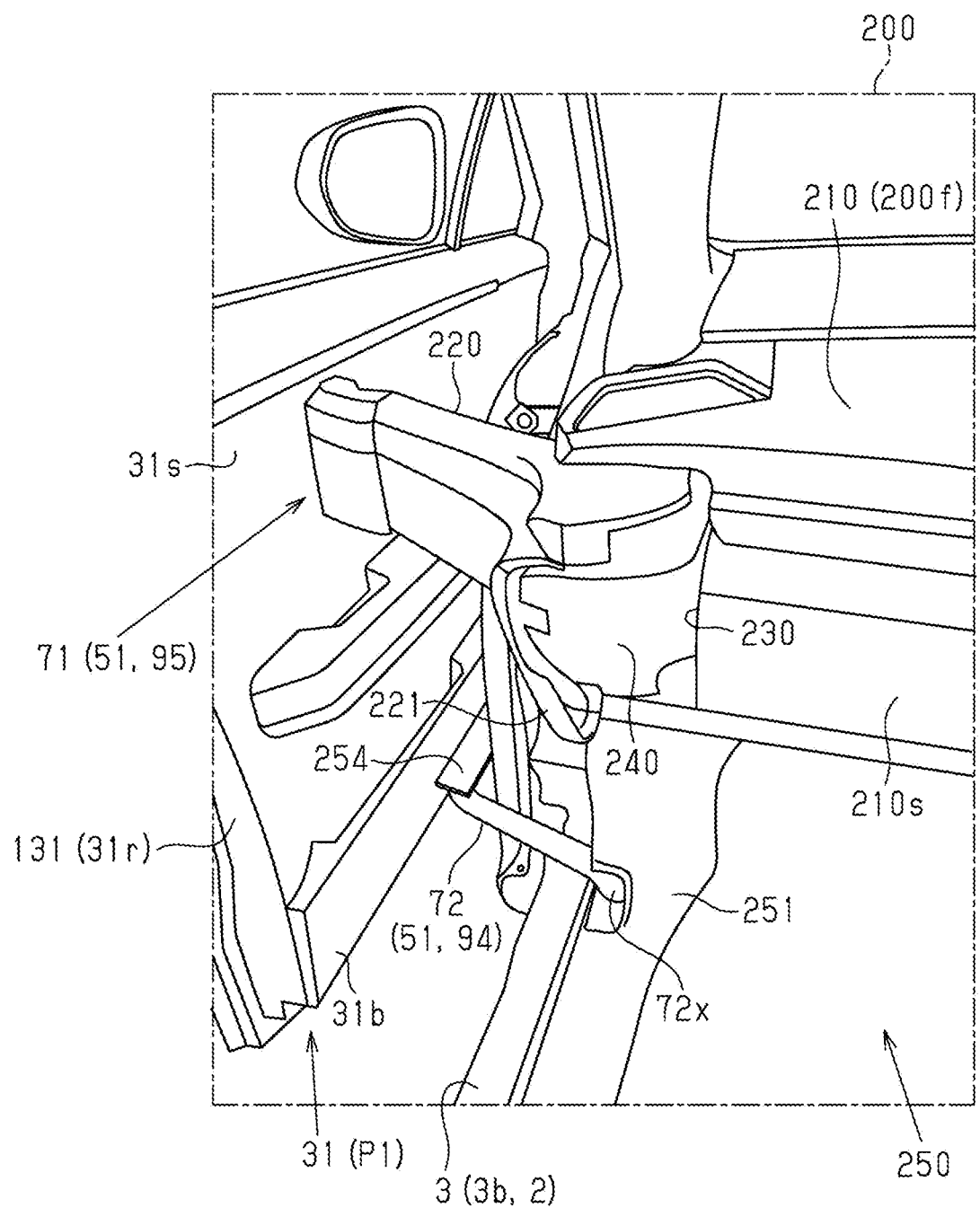
FIG. 12 is an external view of the vicinity of the front door and the dash panel.

As shown in FIGS. 12 and 14, the vehicle door device 30 according to the present embodiment includes a cover member 240 provided in a gap 230 formed between the link cover 220 and the dash panel 210 when the front door 31 is opened.

That is, in the vehicle door device 30 according to the present embodiment, the first link mechanism 51 is in a state in which the first and second link arms 71, 72 extend in the vehicle width direction by the opening of the front door 31. Accordingly, a base end portion 221 side of the link cover 220, which has the substantially L-shaped curved shape and is continuous with the design surface 210s of the dash panel 210, faces the vehicle rear side. Accordingly, the gap 230 between the link cover 220 and the dash panel 210 is enlarged.

In view of this point, in the vehicle door device 30 according to the present embodiment, the cover member 240 disposed in the gap 230 covers the base end portion 71x of the first link arm 71 and the first actuator 161 disposed in the dash panel 210. That is, the cover member 240 hides the base end portion 71x of the first link arm 71 and the first actuator 161 facing a vehicle interior 200 side from the gap 230 between the link cover 220 and the dash panel 210. Accordingly, in the vehicle door device 30 according to the present embodiment, high design characteristics are secured.

As shown in FIGS. 11 to 13 and 15, in the vehicle 1 according to the present embodiment, a lower side of the dash panel 210 is a foot space 250 of an occupant seated on the front seat 201. Further, an interior member 251 that covers an inner side surface (not shown) of the vehicle body 2 that forms a wall surface of the vehicle interior 200 is provided at a position on a side of the foot space 250 formed below the dash panel 210 and on an outer side in the vehicle width direction. The interior member 251 may be referred to as "foot scuff", for example. In the vehicle door device 30 according to the present embodiment, the second link arm 72 constituting the sub-link 94 of the first link mechanism 51 has the first rotary coupling point X1 with respect to the vehicle body 2 inside the interior member 251 disposed on the side of the foot space 250. Specifically, in the vehicle door device 30 according to the present embodiment, the base end portion 72x of the second link arm 72 and a coupling bracket 252 forming the first rotary coupling point X1 are disposed inside the dash panel 210.

That is, in the vehicle 1 according to the present embodiment, due to the arrangement, the base end portion 72x of the second link arm 72 having the first rotary coupling point X1 with respect to the vehicle body 2 is difficult to be seen by the occupant of the vehicle 1. Accordingly, in the vehicle door device 30, high design characteristics are secured.

Figure 16:
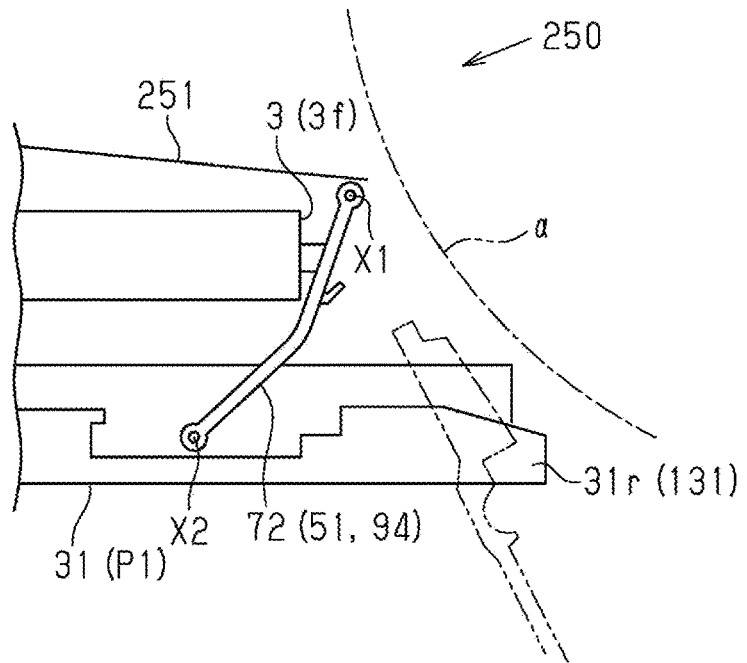
FIG. 16 is an explanatory view showing getting-on-and-off performance of the front door that opens toward the front of the vehicle.

As shown in FIG. 16, in the vehicle door device 30 according to the present embodiment, due to the arrangement of the first rotary coupling point X1 with respect to the vehicle body 2, the front door 31 supported by the second link arm 72 is less likely to interfere with getting on and off through the door opening 3.

That is, the second link arm 72 supporting the lower end portion 31b of the front door 31 operates at a height overlapping a flow line of the feet of the occupant on the front seat 201 when the occupant gets on and off the vehicle. In FIG. 16, a dashed-dotted line α indicates a flow line of the feet of the occupant seated on the front seat 201, specifically, a flow line of heels of the occupant when the occupant gets on and off the vehicle. However, in the vehicle door device 30 according to the present embodiment, in a state in which the front door 31 is in a fully opened position P1, the second link arm 72 supporting the front door 31 is disposed at a position deviated from the flow line of the occupant who gets on and off the vehicle 1. Further, as for a door opening amount of the front door 31 in the fully open state, substantially the same door opening amount is secured as in the case of using a general swing door indicated by a virtual line in FIG. 16. Accordingly, in the vehicle door device 30 according to the present embodiment, the front opening 4 of the door opening 3 in which the front door 31 is provided is capable of securing good getting-on-and-off performance.

Figure 15:
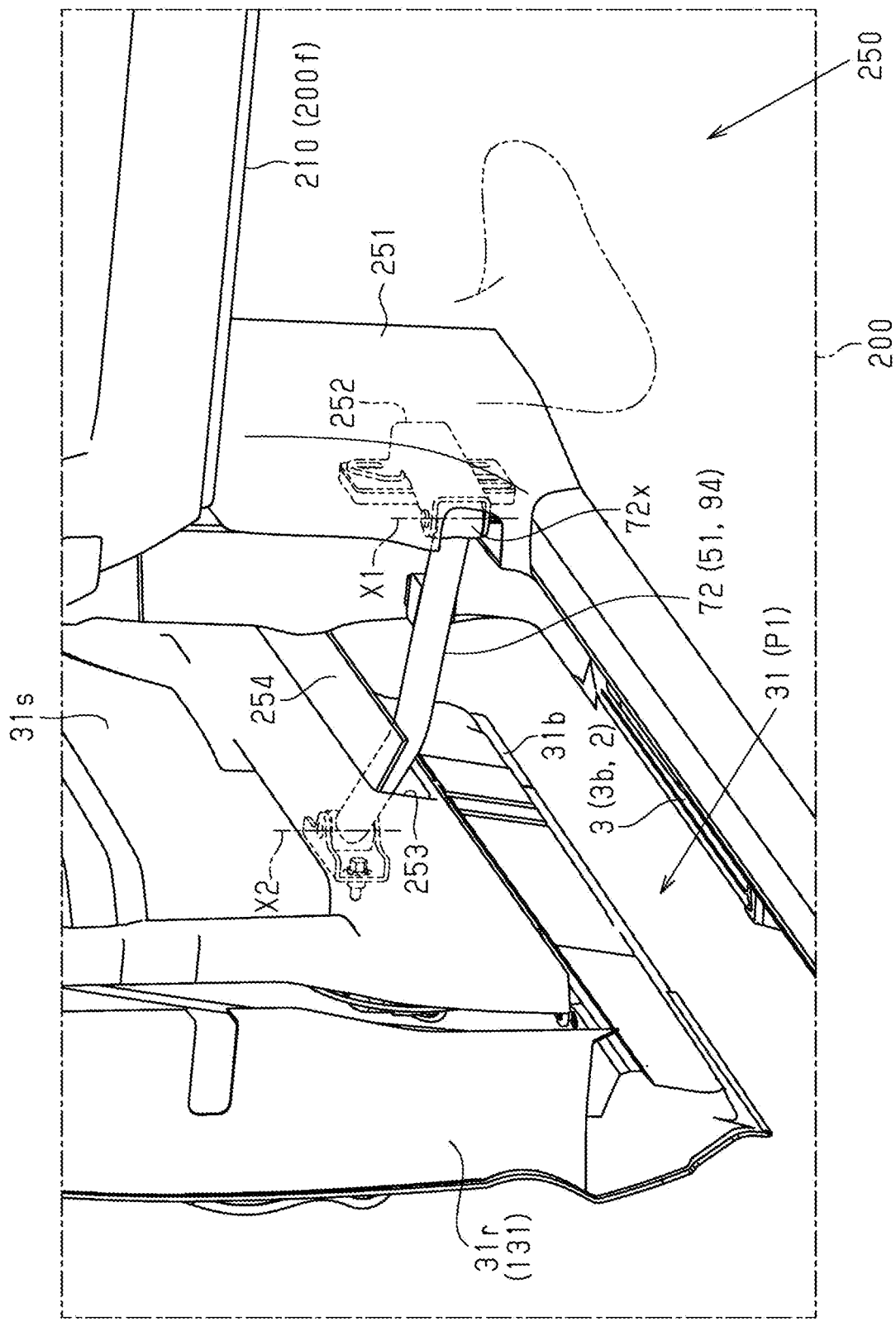
FIG. 15 is an external view of the vicinity of a foot space formed below the dash panel.
Figure 17:
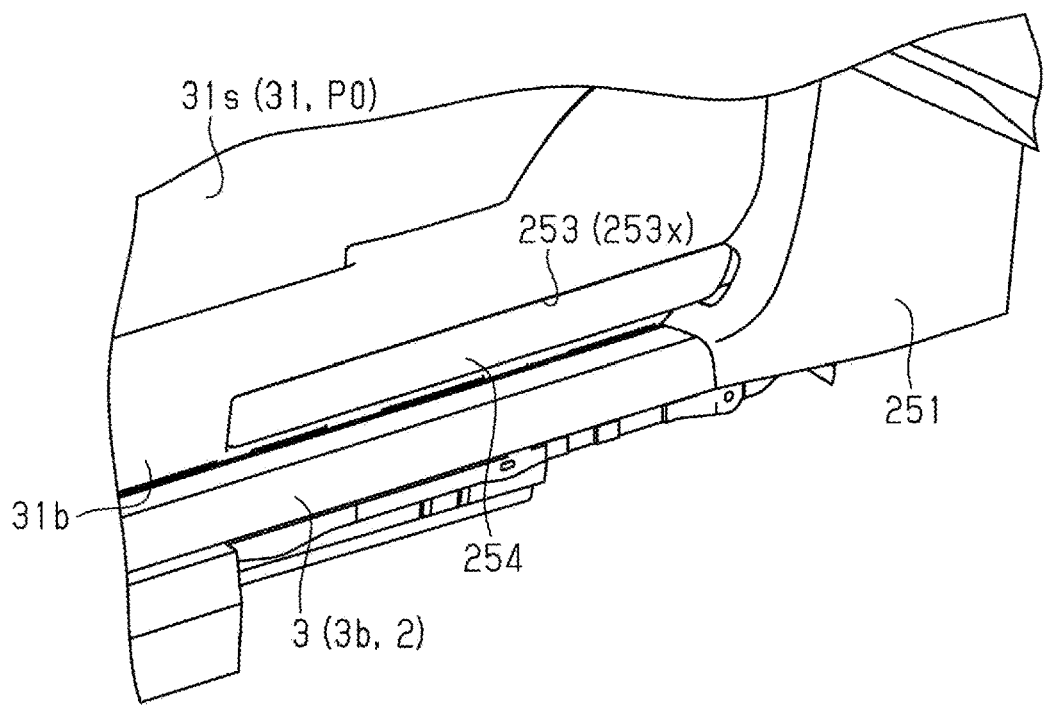
FIG. 17 is an external view of the vicinity of an accommodation recess of the second link arm provided in the front door and a lid member that covers an opening of the accommodation recess.

As shown in FIGS. 13, 15, and 17, in the vehicle 1 according to the present embodiment, an accommodation recess 253 for accommodating the second link arm 72 therein when the front door 31 is closed is formed in the inner side surface 31s of the front door 31. The vehicle door device 30 according to the present embodiment includes a lid member 254 that covers an opening 253x in a state in which the second link arm 72 is accommodated in the accommodation recess 253.

Specifically, the accommodation recess 253 according to the present embodiment has a groove shape extending in the vehicle front-rear direction in the vicinity of the lower end portion 31b of the front door 31. Further, the lid member 254 has a rotary shaft (not shown) at a position above the accommodation recess 253. That is, in the vehicle door device 30 according to the present embodiment, the second link arm 72 is detached from the accommodation recess 253 in a manner of pushing up the lid member 254 when the front door 31 is opened (see FIG. 15). When the front door 31 is closed, the lid member 254 is rotated by an own weight thereof and thereby returned to the position where the lid member 254 covers the opening 253x of the accommodation recess 253 for accommodating the second link arm 72 therein. Accordingly, the vehicle door device 30 according to the present embodiment is implemented such that, when the front door 31 is in the fully closed state, it is difficult for the occupant in the vehicle interior 200 to visually recognize the second link arm 72 forming the first link mechanism 51.

Next, an operation according to the present embodiment will be described.

That is, the front door 31 supported by the first link mechanism 51 that does not include the coupling length variable mechanism 100 is closed to the fully closed position P0 and opened from the fully closed position P0 while drawing the arc-shaped trajectory Rg based on the rotation of the first and second link arms 71, 72. That is, the front door 31 is closed to the fully closed position P0 when the closing end portion tip end 131x moves to the inner side in the vehicle width direction, and is opened from the fully closed position P0 when the closing end portion tip end 131x moves to the outer side in the vehicle width direction.

On the other hand, when the rear door 32 supported by the second link mechanism 52 is in the vicinity of the fully closed position P0, the opening and closing trajectory R2 of the rear door 32 changes based on the operation of the coupling length variable mechanism 100 provided in the second link arm 82. Specifically, the opening and closing trajectory R2 changes from the arc-shaped trajectory Rg based on the rotation of the first and second link arms 81, 82 to the linear trajectory Rs based on the operation of the coupling length variable mechanism 100. That is, the closing end portion tip end 132x of the rear door 32 moves from the vehicle rear side to the front side to close the rear door 32 to the fully closed position P0, and the closing end portion tip end 121x of the rear door 32 moves from the vehicle front side to the rear side to open the rear door 32 from the fully closed position P0. Accordingly, the front door 31 and the rear door 32 can be opened and closed independently of each other without any order restriction.

Next, effects according to the present embodiment will be described.

(1) The vehicle door device 30 includes the first link mechanism 51 formed of the first and second link arms 71, 72 having the first rotary coupling point X1 with respect to the vehicle body 2 and the second rotary coupling point X2 with respect to the door 10 of the vehicle 1. The vehicle door device 30 includes the second link mechanism 52 formed of the first and second link arms 81, 82 provided independently of the first and second link arms 71, 72 forming the first link mechanism 51. Further, the first door 41 supported by the first link mechanism 51 and the second door 42 supported by the second link mechanism 52 are disposed side by side in the door opening 3 formed in the vehicle 1. Further, the first and second doors 41, 42 are opened and closed independently in different directions based on the operation of the corresponding first and second link mechanisms 51, 52. The second link arm 82 constituting the second link mechanism 52 is provided with the coupling length variable mechanism 100 that can change the coupling length L between the first and second rotary coupling points X1, X2.

According to the above configuration, based on the operation of the first and second link mechanisms 51, 52, the first and second doors 41, 42 are opened and closed while drawing the arc-shaped trajectory Rg. That is, when the doors are opened and closed, the first and second doors 41, 42 move in the vehicle front-rear direction at the intermediate opening and closing position. Accordingly, it is possible to reduce the displacement amount in the vehicle width direction, that is, the displacement amount of the opening and closing when the doors protrude in the opening direction of the door opening 3 in which the first and second doors 41, 42 are provided. As a result, the interference with an obstacle located in the opening direction of the door opening 3 can be avoided, and a larger door opening amount can be secured.

Further, when the second door 42 supported by the second link mechanism 52 is in the vicinity of the fully closed position P0 based on the operation of the coupling length variable mechanism 100 provided in the second link arm 82, the opening and closing trajectory R2 can be changed from the arc-shaped trajectory Rg. Accordingly, the interference between the first and second doors 41, 42 in the vicinity of the fully closed position P0 can be avoided. The first and second doors 41, 42 can be opened and closed independently of each other without any order restriction.

(2) In particular, by not providing the coupling length variable mechanism 100 on the first link mechanism 51 side and maintaining the opening and closing trajectory R1 of the arc-shaped trajectory Rg, it is possible to stably avoid the interference between the first and second doors 41, 42 in the vicinity of the fully closed position P0. That is, the opening and closing trajectory R1 of the first door 41 is not changed, so that it is possible to easily identify the opening and closing trajectory of the second door 42 that does not interfere with the first door 41. Accordingly, high reliability can be secured while simplifying the configuration.

(3) Further, the second link mechanism 52 is implemented such that, when the second door 42 is in the vicinity of the fully closed position P0, the opening and closing trajectory R2 thereof is changed to the linear trajectory Rs along the opening width direction of the door opening 3 based on the operation of the coupling length variable mechanism 100.

That is, even in the vicinity of the fully closed position P0, the first door 41 supported by the first link mechanism 51 that does not include the coupling length variable mechanism 100 maintains the arc-shaped trajectory Rg based on the operation of the first link mechanism 51. That is, the first door 41 is closed to the fully closed position P0 by moving to the inner side in the vehicle width direction, and is opened from the fully closed position P0 by moving to the outer side in the vehicle width direction. On the other hand, the second door 42 is closed to the fully closed position P0 by moving from the vehicle rear side to the front side, and is opened from the fully closed position P0 by moving from the vehicle front side to the rear side. Accordingly, the first and second doors 41, 42 can be opened and closed independently of each other without any order restriction.

(4) The first door 41 is the front door 31 that is opened toward the vehicle front side based on the operation of the first link mechanism 51. The second door 42 is the rear door 32 that is opened toward the vehicle rear side based on the operation of the second link mechanism 52.

According to the above configuration, the so-called double opening front door 31 and the so-called double opening rear door 32 that are opened and closed in opposite directions can be disposed with respect to the door opening 3 provided on the side surface 2s of the vehicle body 2. Further, with respect to the front door 31 and the rear door 32, it is possible to reduce the displacement amount of the opening and closing when the doors protrude in the opening direction of the door opening 3, that is, to the outer side in the vehicle width direction. Accordingly, for example, it is possible to avoid the interference with an obstacle located in the opening direction of the door opening, such as a wall located in the vehicle width outer direction or a vehicle stopped adjacent thereto, and to secure a larger door opening amount.

The front door 31 and the rear door 32 can be opened and closed independently of each other without any order restriction. Further, in the vicinity of the fully closed position P0, the front door 31 supported by the first link mechanism 51 that does not include the coupling length variable mechanism 100 is opened and closed in a manner of being displaced in the vehicle width direction. Accordingly, the front door 31 can be opened from the fully closed position P0 and closed to the fully closed position P0 with an operation feeling similar to that of a general swing door.

(5) The vehicle door device 30 includes the door side engagement portion 133 provided at the closing end portion 132 of the rear door 32. In the vehicle door device 30, based on the opening and closing of the rear door 32, a substantially central position in the opening width direction of the door opening 3 which the closing end portion 132 comes into contact with and separates from, that is, a position which is the front end 5f of the rear opening 5 in which the rear door 32 is provided is set as the closing end portion 136 of the door opening 3. The vehicle door device 30 includes the vehicle body side engagement portion 134 provided at the closing end portion 136 of the door opening 3. The door side engagement portion 133 includes the shaft-shaped engagement portion 151 extending in the upper-lower direction of the vehicle 1. The vehicle body side engagement portion 134 has the guide groove 152 that includes the pair of side wall portions 152a, 152b facing each other in the vehicle width direction which is the opening direction of the door opening 3 and that extends in the opening and closing direction of the rear door 32. In the vehicle door device 30 according to the present embodiment, when the door side engagement portion 133 and the vehicle body side engagement portion 134 are in the vicinity of the fully closed position P0 of the rear door 32 where the door side engagement portion 133 and the vehicle body side engagement portion 134 are engaged with each other, the shaft-shaped engagement portion 151 is disposed in the guide groove 152.

According to the above configuration, since the shaft-shaped engagement portion 151 is disposed in the guide groove 152, the displacement of the rear door 32 is restricted in the vehicle width direction, that is, in the opening direction of the door opening 3. Accordingly, the rear door 32 can be stably supported even in the vicinity of the fully closed position P0 where the distance between the first and second link arms 81, 82 forming the second link mechanism 52 is likely to be reduced and the first and second link arms 81, 82 are likely to be linearly arranged.

(6) Further, in a state in which the door side engagement portion 133 and the vehicle body side engagement portion 134 are engaged with each other, the opening and closing trajectory R2 of the rear door 32 changes from the arc-shaped trajectory Rg to the linear trajectory Rs based on the operation of the coupling length variable mechanism 100. Accordingly, even when the front door 31 is in the fully closed state, the rear door 32 can be smoothly closed to the fully closed position P0 and opened from the fully closed position P0.

(7) The vehicle door device 30 includes a pair of vehicle body side engagement portions 134, 134 that are provided at the upper edge portion 3a and the lower edge portion 3b of the door opening 3. The vehicle door device 30 includes a pair of door side engagement portions 133, 133 that are provided at the closing end portion 132 of the rear door 32 and that engage with the vehicle body side engagement portions 134, 134.

According to the above configuration, the rear door 32 can be supported more stably in the vicinity of the fully closed position P0. Further, there is an advantage that the embodiment disclosed here can be applied to a so-called pillarless structure in which the closing end portion 136 of the door opening 3 does not have a structure extending in the upper-lower direction such as a "B pillar". In the door opening 3, the vehicle body side engagement portion 134 is disposed.

(8) Further, for the closing end portion 132 of the rear door 32 provided with the pair of door side engagement portions 133, 133, the lock device 180 for restraining the rear door 32 at the fully closed position P0 can be eliminated. That is, even when the rear door 32 is in the fully closed state, it is possible to stably hold the closing end portion 132 of the rear door 32 based on an engagement force of the pair of door side engagement portions 133, 133 and the pair of vehicle body side engagement portions 134, 134 that are provided at the closing end portion 132. Accordingly, it is possible to stably support the rear door 32 at the fully closed position P0 while simplifying the configuration.

(9) The vehicle door device 30 includes the pair of strikers 173, 174 provided at the upper edge portion 3a and the lower edge portion 3b of the door opening 3. Further, the vehicle door device 30 includes the upper lock 183 and the lower lock 184 as a pair of lock devices 180 that are provided at the closing end portion 131 of the front door 31 and that engage with the strikers 173, 174.

According to the above configuration, the front door 31 can be stably restrained at the fully closed position P0. Further, there is an advantage that the embodiment disclosed here can be applied to a so-called pillarless structure in which the closing end portion 135 of the door opening 3 does not have a structure extending in the upper-lower direction such as a "B pillar". In the door opening 3, the striker is to be disposed.

(10) The vehicle door device 30 includes the striker 175 provided at the closing end portion 132 of the rear door 32, and the center lock 185 as the lock device 180 provided at the closing end portion 131 of the front door 31. When the striker 175 and the center lock 185 are engaged with each other, the front door 31 and the rear door 32 are restrained at the fully closed position.

According to the above configuration, even when the door opening 3 has the so-called pillarless structure in which the closing end portions 135, 136 thereof do not have a structure extending in the upper-lower direction such as a "B pillar", the front door 31 and the rear door 32 can be stably restrained at the fully closed position P0.

(11) The vehicle door device 30 includes the first actuator 161 that applies a driving force to the first link mechanism 51 to open and close the front door 31, and the second actuator 162 that applies a driving force to the second link mechanism 52 to open and close the rear door 32. Accordingly, convenience can be improved.

The above embodiment can be modified and implemented as follows. The above embodiment and following modifications can be implemented in combination with each other within a technically consistent range.

In the above embodiment, the coupling length variable mechanism 100 is provided for the second link arm 82 constituting the sub-link 94 among the first and second link arms 81, 82 constituting the second link mechanism 52. However, the embodiment disclosed here is not limited thereto. The coupling length variable mechanism 100 may be provided in the first link arm 81 constituting the main link 95, or the coupling length variable mechanism 100 may be provided in both the first and second link arms 81, 82. Even with such a configuration, it is possible to change the opening and closing trajectory R2 of the rear door 32 based on the operation of the coupling length variable mechanism 100. Accordingly, the interference between the first and second doors 41, 42 in the vicinity of the fully closed position P0 can be avoided. The first and second doors 41, 42 can be opened and closed independently of each other without any order restriction.

A configuration may be adopted in which the coupling length variable mechanism 100 is provided on the first link mechanism 51 side. Also in this case, the coupling length variable mechanism 100 may be provided at least one of the first and second link arms 71, 72 forming the first link mechanism 51. Accordingly, the opening and closing trajectory R1 of the front door 31 can be changed based on the operation of the coupling length variable mechanism 100. The coupling length variable mechanism 100 may be provided in both the first and second link mechanisms 51, 52.

That is, the coupling length variable mechanism 100 may be provided in any one of the first and second link arms 71, 72 forming the first link mechanism 51 and the first and second link arms 81, 82 forming the second link mechanism 52. Accordingly, the interference between the first and second doors 41, 42 in the vicinity of the fully closed position P0 can be avoided. The first and second doors 41, 42 can be opened and closed independently of each other without any order restriction.

In the above embodiment, the coupling length variable mechanism 100 has a configuration as the joint link mechanism 110 in which the vehicle body side link 101 having the first rotary coupling point X1 and the door side link 102 having the second rotary coupling point X2 are rotatably coupled. However, the embodiment disclosed here is not limited thereto. The configuration of the coupling length variable mechanism 100 may be freely changed using a linear extension and contraction link mechanism or the like.

In the above embodiment, when the rear door 32 is in the vicinity of the fully closed position P0, the opening and closing trajectory R2 of the rear door 32 is changed to the linear trajectory Rs. However, the embodiment disclosed here is not limited thereto. The opening and closing trajectory R2 after the change may not necessarily be the same linear trajectory Rs as in the above described embodiment. That is, the interference between the first and second doors 41, 42 may be avoided in the vicinity of the fully closed position P0.

In the above embodiment, the first door 41 is the front door 31 that is opened toward the vehicle front side based on the operation of the first link mechanism 51. The second door 42 is the rear door 32 that is opened toward the vehicle rear side based on the operation of the second link mechanism 52. However, the embodiment disclosed here is not limited thereto. The first door 41 may be the rear door 32. The second door 42 may be the front door 31. The first and second doors 41, 42 may be back doors of the vehicle 1, for example, may be provided at a location other than the door opening 3 that opens at the side surface 2s of the vehicle body 2, such as a rear hatch that opens at the rear of the vehicle 1.

In the above embodiment, the door opening 3 does not have a pillar structure at the central portion in the vehicle front-rear direction, and has a so-called pillarless structure in which the front opening 4 and the rear opening 5 are integrated. However, the embodiment disclosed here is not limited thereto, and may be applied to a structure in which the door opening 3 having a pillar structure at the central portion in the opening width direction, for example, the front opening 4 and the rear opening 5 are partitioned by a "B pillar".

In the above embodiment, when the striker 175 is provided at the closing end portion 132 of the rear door 32, the lock device 180 that engages with the striker 175 is provided at the closing end portion 131 of the front door 31. However, the embodiment disclosed here is not limited thereto. The striker 175 may be provided at the closing end portion 131 of the front door 31, and the lock device 180 that engages with the striker 175 may be provided at the closing end portion 132 of the rear door 32.

In the above embodiment, a pair of strikers 173, 174 provided at the upper edge portion 3a and the lower edge portion 3b of the door opening 3 are provided. The upper lock 183 and the lower lock 184 that engage with the strikers 173, 174 are provided at the closing end portion 131 of the front door 31. However, the embodiment disclosed here is not limited thereto. Such a pair of upper and lower lock devices 180, 180 may be provided at the closing end portion 132 of the rear door 32.

In the above embodiment, a pair of door side engagement portions 133, 133 that are provided at the closing end portion 132 of the rear door 32 and a pair of vehicle body side engagement portions 134, 134 that are provided at the upper edge portion 3a and the lower edge portion 3b of the door opening 3 are provided. However, the embodiment disclosed here is not limited thereto, and the arrangement of the door side engagement portion 133 and the vehicle body side engagement portion 134 may be freely changed. For example, when the door opening 3 has a structure extending in the upper-lower direction such as the "B pillar", the vehicle body side engagement portion 134 may be provided here. Further, the number of the door side engagement portions 133 and the vehicle body side engagement portions 134 may also be one, or three or more.

In the above embodiment, the door side engagement portion 133 includes the shaft-shaped engagement portion 151, and the vehicle body side engagement portion 134 has the guide groove 152. However, the embodiment disclosed here is not limited thereto. The door side engagement portion 133 may have the guide groove 152. The vehicle body side engagement portion 134 may include the shaft-shaped engagement portion 151.

The door side engagement portion 133 and the vehicle body side engagement portion 134 as described above may be provided at the closing end portion 131 of the front door 31. That is, the second door 42 supported by the second link mechanism 52, which is the link mechanism 20 that does not include the coupling length variable mechanism 100, may be provided with the door side engagement portion 133 and the vehicle body side engagement portion 134. However, a more remarkable effect can be attained by adopting a configuration in which the door side engagement portion 133 and the vehicle body side engagement portion 134 are provided in the first door 41 supported by the first link mechanism 51, which is the link mechanism 20 including the coupling length variable mechanism 100.

In the above embodiment, the first actuator 161 for opening and closing the first door 41 and the second actuator 162 for opening and closing the second door 42 are provided. However, the embodiment disclosed here is not limited thereto, and may be applied to a configuration in which one or both of the first and second doors 41, 42 are manually opened and closed. The arrangement of the actuators 160 and a transmission structure of the driving force may also be freely changed.

According to an aspect of this disclosure, a vehicle door device includes: a first link mechanism formed of first and second link arms having a first rotary coupling point with respect to a vehicle body and a second rotary coupling point with respect to a door of a vehicle; and a second link mechanism formed of the first and second link arms provided independently of the first and second link arms forming the first link mechanism. A first door supported by the first link mechanism and a second door supported by the second link mechanism are disposed side by side in a door opening formed in the vehicle, and thereby open and close independently in different directions based on operations of the first and second link mechanisms. At least one of the first and second link arms forming the first link mechanism and the first and second link arms forming the second link mechanism is provided with a coupling length variable mechanism that allows a coupling length between the first and second rotary coupling points to vary.

According to the above configuration, based on operations of the first and second link mechanisms, the first and second doors are opened and closed while drawing an arc-shaped trajectory. That is, when the doors are opened and closed, the first and second doors move in an opening width direction of a door opening at an intermediate opening and closing position. Accordingly, it is possible to prevent a displacement amount of opening and closing when the doors protrude in an opening direction of the door opening in which the first and second doors are provided. For example, in the case of a door opening formed on a side surface of the vehicle body, the "opening width direction" is a vehicle front-rear direction, and the "opening direction" is a vehicle width direction. As a result, interference with an obstacle located in the opening direction of the door opening can be avoided, and a larger door opening amount can be secured.

Further, when the door is in the vicinity of a fully closed position, the opening and closing trajectory of the door can be changed from the arc-shaped trajectory based on an operation of the coupling length variable mechanism provided in the link mechanism supporting the door. Accordingly, interference between the first and second doors in the vicinity of the fully closed position can be avoided. The first and second doors can be opened and closed independently of each other without any order restriction.

The vehicle door device according to the above aspect is preferably implemented such that, when the door supported by the link mechanism including the coupling length variable mechanism is in the vicinity of the fully closed position, the opening and closing trajectory of the door is changed to a linear trajectory along the opening width direction of the door opening based on the operation of the coupling length variable mechanism.

According to the above configuration, in the vicinity of the fully closed position, the door supported by the link mechanism including the coupling length variable mechanism is opened and closed while drawing the linear trajectory along the opening direction width of the door opening. Accordingly, the first and second doors can be opened and closed independently of each other without any order restriction.

In the vehicle door device according to the above aspect, it is preferable that the coupling length variable mechanism is provided on a second link mechanism side, and the coupling length variable mechanism is not provided on a first link mechanism side.

That is, the opening and closing trajectory of the first door is not changed, so that it is possible to easily identify the opening and closing trajectory of the second door that does not interfere with the first door. Accordingly, high reliability can be secured with a simple configuration.

In the vehicle door device according to the above aspect, it is preferable that the first door is a front door that is opened toward a vehicle front side based on an operation of the first link mechanism, and the second door is a rear door that is opened toward a vehicle rear side based on an operation of the second link mechanism.

According to the above configuration, a so-called double opening front door and a so-called double opening rear door that are opened and closed in opposite directions can be disposed with respect to the door opening provided on the side surface of the vehicle body. Further, with respect to the front door and the rear door, it is possible to prevent the displacement amount of opening and closing when the doors protrude in the opening direction of the door opening, that is, to the outer side in the vehicle width direction. Accordingly, for example, it is possible to avoid the interference with an obstacle located in the opening direction of the door opening, such as a wall located in the vehicle width outer direction or a vehicle stopped adjacent thereto, and to secure a larger door opening amount. In addition, the front door and the rear door can be opened and closed independently of each other without any order restriction.

The vehicle door device according to the above aspect preferably further includes: a door side engagement portion provided at a closing end portion of the door; and a vehicle body side engagement portion provided at a closing end portion of the door opening which the closing end portion of the door comes into contact with and separates from based on the opening and closing of the door. One side of the door side engagement portion and the vehicle body side engagement portion preferably includes a shaft-shaped engagement portion extending in an upper-lower direction of the vehicle. The other side of the door side engagement portion and the vehicle body side engagement portion preferably has a guide groove that includes a pair of side wall portions facing each other in an opening direction of the door opening and that extends in an opening and closing direction of the door. The shaft-shaped engagement portion is preferably disposed in the guide groove when the door in which the door side engagement portion and the vehicle body side engagement portion are engaged with each other is in the vicinity of a fully closed position.

According to the above configuration, since the shaft-shaped engagement portion is disposed in the guide groove, displacement of the door provided with the door side engagement portion is restricted in the opening direction of the door opening. Accordingly, the door supported by the link mechanism can be stably supported even in the vicinity of the fully closed position where a distance between the first and second link arms forming the link mechanism is likely to be reduced and the first and second link arms are likely to be linearly arranged.

In the vehicle door device according to the above aspect, it is preferable that the door side engagement portion and the vehicle body side engagement portion are provided in the door that is supported by the link mechanism including the coupling length variable mechanism.

According to the above configuration, in a state in which the door side engagement portion and the vehicle body side engagement portion are engaged with each other, the opening and closing trajectory of the door provided with the door side engagement portion changes from the arc-shaped trajectory to the linear trajectory based on the operation of the coupling length variable mechanism. Accordingly, even when the door on the other side which is paired with the door on one side provided with the door side engagement portion is in the fully closed state, the one door can be smoothly closed to the fully closed position and opened from the fully closed position.

The vehicle door device according to the above aspect preferably further includes: a pair of the vehicle body side engagement portions provided at an upper edge portion and a lower edge portion of the door opening; and a pair of the door side engagement portions engaged with the vehicle body side engagement portions.

According to the above configuration, it is possible to more stably support the door provided with the door side engagement portion in the vicinity of the fully closed position. Further, there is an advantage that the embodiment disclosed here can be applied to a so-called pillarless structure in which the closing end portion of the door opening does not have a structure extending in the upper-lower direction such as a "B pillar". In the door opening, the vehicle body side engagement portion is disposed.

In the vehicle door device according to the above aspect, it is preferable that a lock device configured to restrain the door at the fully closed position is not provided at the closing end portion of the door provided with the pair of door side engagement portions.

According to the above configuration, even in the fully closed state, the closing end portion of the door provided with the pair of upper and lower door side engagement portions can be stably held based on an engagement force of the pair of door side engagement portions provided at the closing end portion and the vehicle body side engagement portions. Accordingly, it is possible to stably support the door at the fully closed position while simplifying the configuration.

The vehicle door device according to the above aspect preferably further includes: a pair of strikers provided at an upper edge portion and a lower edge portion of the door opening; and a pair of lock devices provided at a closing end portion of the door and configured to engage with the strikers to restrain the door at a fully closed position.

According to the above configuration, the door provided with the pair of upper and lower lock devices can be more stably restrained at the fully closed position. Further, there is an advantage that the embodiment disclosed here can be applied to a so-called pillarless structure in which the closing end portion of the door opening does not have a structure extending in the upper-lower direction such as a "B pillar". In the door opening, the striker is to be disposed.

The vehicle door device according to the above aspect preferably further includes: a striker provided at a closing end portion of one of the first and second doors; and a lock device provided at a closing end portion of the other one of the first and second doors and configured to engage with the striker to restrain the first and second doors at a fully closed position.

According to the above configuration, even when the door opening has the so-called pillarless structure in which the closing end portions thereof do not have the structure extending in the upper-lower direction such as the "B pillar", the first and second doors provided side by side in the opening width direction of the door opening can be stably restrained at the fully closed position.

The vehicle door device according to the above aspect preferably further includes: a first actuator configured to apply a driving force to the first link mechanism to open and close the first door; and a second actuator configured to apply a driving force to the second link mechanism to open and close the second door.

According to the above configuration, convenience can be improved.

In the vehicle door device according to the above aspect, it is preferable that the first door and the second door are disposed at a fully closed position in a state in which closing end portion tip ends of the first door and the second door overlap each other in an opening direction of the door opening.

According to this disclosure, it is possible to secure a larger door opening amount by reducing a displacement amount of opening and closing when the doors protrude in the opening direction of the door opening.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle door device comprising:
a first link mechanism formed of first and second link arms having a first rotary coupling point with respect to a vehicle body and a second rotary coupling point with respect to a door of a vehicle;
a second link mechanism formed of the first and second link arms provided independently of the first and second link arms forming the first link mechanism;
a door side engagement portion provided at a closing end portion of the door;
a vehicle body side engagement portion provided at a closing end portion of the door opening which the closing end portion of the door comes into contact with and separates from based on the opening and closing of the door;
a pair of the vehicle body side engagement portions provided at an upper edge portion and a lower edge portion of the door opening; and
a pair of the door side engagement portions configured to engage with the vehicle body side engagement portions, wherein
a first door supported by the first link mechanism and a second door supported by the second link mechanism are disposed side by side in a door opening formed in the vehicle, and thereby open and close independently in different directions based on operations of the first and second link mechanisms,
at least one of the first and second link arms forming the first link mechanism and the first and second link arms forming the second link mechanism is provided with a coupling length variable mechanism that allows a coupling length between the first and second rotary coupling points to vary,
one side of the door side engagement portion and the vehicle body side engagement portion includes a shaft-shaped engagement portion extending in an upper-lower direction of the vehicle,
the other side of the door side engagement portion and the vehicle body side engagement portion has a guide groove that includes a pair of side wall portions facing each other in an opening direction of the door opening and that extends in an opening and closing direction of the door, and
the shaft-shaped engagement portion is disposed in the guide groove when the door in which the door side engagement portion and the vehicle body side engagement portion are engaged with each other is in the vicinity of a fully closed position.

2. The vehicle door device according to claim 1, wherein when the door including the coupling length variable mechanism is in the vicinity of a fully closed position, an opening and closing trajectory of the door is changed to a linear trajectory along an opening width direction of the door opening based on an operation of the coupling length variable mechanism.

3. The vehicle door device according to claim 1, wherein the coupling length variable mechanism is provided on a second link mechanism side, and
the coupling length variable mechanism is not provided on a first link mechanism side.

4. The vehicle door device according to claim 1, wherein
the first door is a front door configured to be opened toward a vehicle front side based on an operation of the first link mechanism, and the second door is a rear door configured to be opened toward a vehicle rear side based on an operation of the second link mechanism.

5. The vehicle door device according to claim 1, wherein the door side engagement portion and the vehicle body side engagement portion are provided in the door including the coupling length variable mechanism.

6. The vehicle door device according to claim 1, wherein a lock device configured to restrain the door at a fully closed position is not provided at the closing end portion of the door provided with the pair of door side engagement portions.

7. The vehicle door device according to claim 1, further comprising:
    a pair of strikers provided at an upper edge portion and a lower edge portion of the door opening; and
    a pair of lock devices provided at a closing end portion of the door and configured to engage with the strikers to restrain the door at a fully closed position.

8. The vehicle door device according to claim 1, further comprising:
    a striker provided at a closing end portion of one of the first and second doors; and
    a lock device provided at a closing end portion of the other one of the first and second doors and configured to engage with the striker to restrain the first and second doors at a fully closed position.

9. The vehicle door device according to claim 1, further comprising:
    a first actuator configured to apply a driving force to the first link mechanism to open and close the first door; and
    a second actuator configured to apply a driving force to the second link mechanism to open and close the second door.

10. The vehicle door device according to claim 1, wherein the first door and the second door are disposed at a fully closed position in a state in which closing end portion tip ends of the first door and the second door overlap each other in an opening direction of the door opening.

* * * * *